(12) United States Patent
Gray et al.

(10) Patent No.: US 8,438,081 B2
(45) Date of Patent: May 7, 2013

(54) METHODS AND SYSTEMS FOR ONLINE SHOPPING

(75) Inventors: Beau Gray, Pittsburgh, PA (US); Katherine Jassy Savitt, Sewickley, PA (US)

(73) Assignee: Retail Royalty Company, Las Vegas, NV (US)

( * ) Notice: Subject to any disclaimer, the term of this patent is extended or adjusted under 35 U.S.C. 154(b) by 576 days.

(21) Appl. No.: 12/575,299

(22) Filed: Oct. 7, 2009

(65) Prior Publication Data

US 2010/0094729 A1    Apr. 15, 2010

Related U.S. Application Data

(60) Provisional application No. 61/195,821, filed on Oct. 9, 2008, provisional application No. 61/119,649, filed on Dec. 3, 2008.

(51) Int. Cl.
*G06Q 30/00* (2012.01)

(52) U.S. Cl.
USPC .................. 705/27.2; 705/27.1; 705/26.8

(58) Field of Classification Search .................. 705/27.1, 705/27.2, 26.1, 26.7, 26.8
See application file for complete search history.

(56) References Cited

U.S. PATENT DOCUMENTS

| | | | | |
|---|---|---|---|---|
| 5,680,528 | A | 10/1997 | Korszum | 395/135 |
| 5,930,769 | A | 7/1999 | Rose | 705/27 |
| 6,029,141 | A * | 2/2000 | Bezos et al. | 705/27.1 |
| 6,206,750 | B1 | 3/2001 | Barad et al. | 446/268 |
| 6,307,568 | B1 | 10/2001 | Rom | 345/629 |
| 6,310,627 | B1 | 10/2001 | Sakaguchi | 345/630 |
| 6,317,722 | B1 | 11/2001 | Jacobi et al. | 705/14 |
| 6,546,309 | B1 | 4/2003 | Gazzuolo | 700/132 |
| 6,901,379 | B1 | 5/2005 | Balter et al. | 705/27 |
| 6,903,756 | B1 | 6/2005 | Giannini | 345/747 |
| 7,082,416 | B2 | 7/2006 | Anderson | 705/74 |
| 7,133,839 | B2 | 11/2006 | Inoue et al. | 705/27 |
| 7,149,665 | B2 | 12/2006 | Feld et al. | 703/2 |
| 7,149,710 | B1 | 12/2006 | Edmark | 705/26 |
| 7,165,041 | B1 * | 1/2007 | Guheen et al. | 705/26.1 |
| 7,194,428 | B2 | 3/2007 | Wan et al. | 705/26 |
| 2001/0039517 | A1 | 11/2001 | Kawakatsu | 705/26 |
| 2002/0099667 | A1 | 7/2002 | Diamandis et al. | 705/74 |
| 2003/0115105 | A1 | 6/2003 | Lin et al. | 705/26 |
| 2004/0039592 | A1 | 2/2004 | Shima | 705/1 |
| 2005/0071242 | A1 | 3/2005 | Allen et al. | 705/26 |

(Continued)

OTHER PUBLICATIONS

Anon., "The New Virtual Fashion Basic," Computer Graphics World, vol. 29, No. 7, p. 4, Jul. 2006.*

(Continued)

*Primary Examiner* — Nicholas D Rosen
(74) *Attorney, Agent, or Firm* — Wood, Herron & Evans, LLP

(57) ABSTRACT

Systems, methods, or media is directed to managing an outfit over a network. A navigation of an electronic media source is provided with a virtual closet widget representative of outfit data for display on at least one device. An activation component is provided within the virtual closet widget to configure a panel. The panel provides a selectable catalog of items that are configured to be added into the outfit data. In response to adding an item, a visual indication of the item on the virtual closet widget is provided, wherein the item comprises at least one unset attribute for setting through the virtual closet.

19 Claims, 24 Drawing Sheets

U.S. PATENT DOCUMENTS

| | | |
|---|---|---|
| 2005/0108130 A1 | 5/2005 | Monk ............................. 705/35 |
| 2005/0165649 A1 | 7/2005 | Mahaffey et al. ............... 705/26 |
| 2005/0197927 A1 | 9/2005 | Martineau et al. .............. 705/27 |
| 2005/0234782 A1* | 10/2005 | Schackne et al. ............... 705/27 |
| 2005/0261968 A1 | 11/2005 | Randall et al. .................. 705/16 |
| 2006/0293965 A1* | 12/2006 | Burton ............................ 705/26 |
| 2007/0174143 A1 | 7/2007 | Smilowitz et al. .............. 705/27 |
| 2007/0282741 A1 | 12/2007 | Kumar et al. ................... 705/40 |
| 2007/0290038 A1* | 12/2007 | Woodcock et al. ............ 235/383 |
| 2008/0082395 A1* | 4/2008 | Shulman et al. ................ 705/10 |
| 2008/0097975 A1* | 4/2008 | Guay et al. ...................... 707/4 |
| 2008/0228600 A1* | 9/2008 | Treyz et al. ..................... 705/27 |
| 2009/0048935 A1 | 2/2009 | Blanc et al. ..................... 705/17 |
| 2009/0089668 A1* | 4/2009 | Magnani et al. .............. 715/273 |
| 2009/0106115 A1 | 4/2009 | James et al. .................... 705/14 |
| 2010/0031148 A1* | 2/2010 | Rivera ........................... 715/716 |
| 2011/0078055 A1* | 3/2011 | Faribault et al. ............. 705/27.2 |

OTHER PUBLICATIONS http://www.wetseal.com/outfitter/outfitter.jsp, Oct. 7, 2009.
http://tinachen.org/portfolio/stylemaker.html, As of Jun. 10, 2008.

* cited by examiner

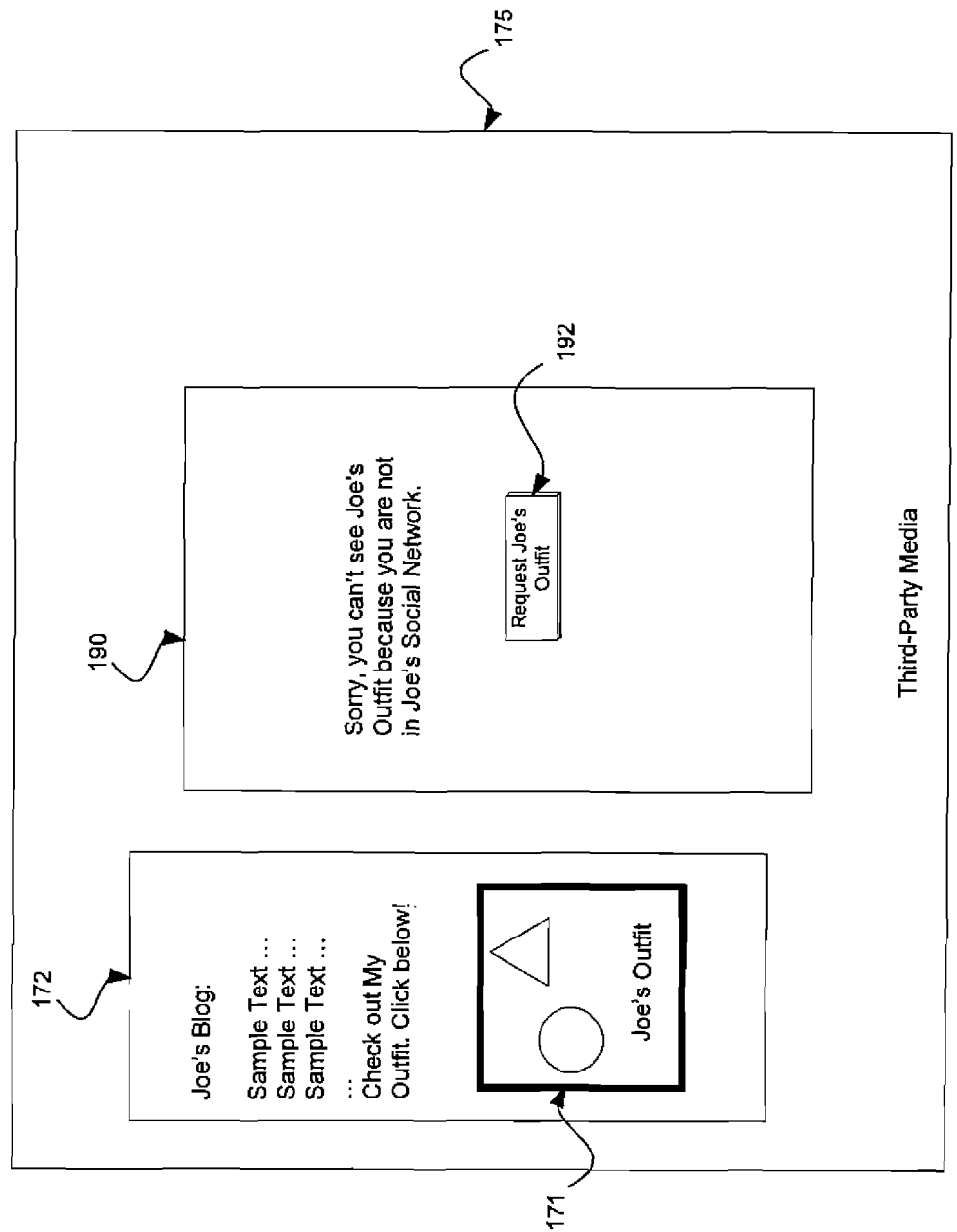

METHODS AND SYSTEMS FOR ONLINE SHOPPING

RELATED APPLICATIONS

This application claims the benefit of and expressly incorporates by reference all of the disclosure of U.S. Provisional Application No. 61/195,821 entitled "METHODS AND SYSTEMS FOR ONLINE SHOPPING", filed Oct. 9, 2008, and U.S. Provisional Application No. 61/119,649 entitled "METHODS AND SYSTEMS FOR ONLINE SHOPPING", filed Dec. 3, 2008.

FIELD OF THE INVENTION

This invention generally relates to online shopping, and more particularly, but not exclusively, to features for enhancing the user experience.

BACKGROUND

Online shopping systems, and in particular clothing and apparel shopping systems, often enable a shopper to search for items, place the items in a cart, and/or purchase the items. Placement in an online cart often is unordered. The cart may exist for a short period of time, e.g., over a few sessions of shopping. However, managing the configuration of the items is limited and often is only provided when browsing for the items within a catalog. It is with respect to these issues and others that the present invention is directed.

In addition, online shopping interfaces and features currently known to be offered are often times kludgy, difficult to interact with, cumbersome, or inefficient. For example, they typically do not provide qualities sometimes found useful in shopping for goods in person. These deficiencies can reduce the stickiness of a sites which works against the intended business purpose of driving sales and consumer loyalty. Also for example, known shopping sites do not take the approach of establishing features to extend the length of time a user stays in the site to shop.

Other problems have to do with providing features within the confines of interacting through a computer graphical interface. Developing new tools for user interaction and shopping that are for example clever in their ease of use or in their interaction to enhance the shopping experience would be of value.

SUMMARY

The invention relates to a computer-implemented method, system, apparatus, and media for managing shopping. In one embodiment, a method is directed to managing an outfit over a network. The method includes providing, over the network, a navigation of an electronic media source while simultaneously providing, over the network, a virtual closet widget representative of outfit data for display on at least one device; providing an activation component within the virtual closet widget to configure a panel for providing a selectable catalog of items that are configured to be added into the outfit data; and in response to adding an item, providing a visual indication of the item on the virtual closet widget, wherein the item comprises at least one unset attribute for setting through the virtual closet. The method may also include providing a configuration component within the virtual closet for configuring the unset attribute of the item, if the item is marked as available within the catalog. In one embodiment, the items within the virtual closet comprise at least one purchased item, at least one unpurchased item from the catalog, or at least one unpurchasable item. The method may also include receiving a drag-and-drop of the item from a plurality of portions of the electronic media source. The method may also include embedding the virtual closet within a webpage of a first web domain; and relaying commands for managing the virtual closet between the first web domain and a second web domain.

In one embodiment, a system is directed to managing an outfit over a network. The system includes a closet datastore comprising outfit data representative of at least one outfit; and a virtual closet manager configured to perform actions. The actions can include providing, over the network, at least one virtual closet widget representative of the outfit data for display on at least one network device; adding an item configurable within the outfit data to cause a visual indication of the adding to appear on the virtual closet widget. In one embodiment, the actions further include providing, over the network, a navigation of an electronic media source while simultaneously providing at least one virtual closet widget, wherein the item is added from the electronic media source.

In one embodiment, the electronic media source comprises a webpage. The webpage can include a catalog mode wherein a region displayed where a user can browse catalog items and select to take different actions with respect to the catalog items including adding the item to a closet, an outfit canvas, or a shopping basket to finalize a purchase; a closet mode wherein shoppers can add items from the catalog to store the item indicating a state of added interest while the shopper stays in the website and wherein the shopper can add the item from the closet to the shopping basket to finalize a purchase or select to remove the item from the closet; an outfit canvas mode wherein individual shoppers can try out visual combinations and arrangements of the item to coordinate and evaluate and wherein two or more items can be resized or moved on the canvas to allow the shopper to assemble various arrangements or combinations to aid in the evaluation of the items and further wherein a shopper can name and save an outfit comprising multiple items to be held in the closet; and a shopping basket mode wherein a shopper can add items to a basket that the shopper has decided to purchase at checkout.

In one embodiment, adding the item further comprises receiving network data comprising a Uniform Resource Identifier (URI) representative of the item and a configuration of the item within the at least one outfit, wherein the URI is received from an electronic media source other than the electronic media source displaying the at least one virtual closet widget, and wherein the URI is provided in the electronic media source as a link attached to a multimedia item representative of the outfit.

In one embodiment, the actions further include personalizing an outfit based on style information about a user's clothing preferences. The system may also include a clothing item catalog of purchasable clothing items configured to provide a drill-down of a plurality of clothing items through a visual indication of the clothing item within at least one of the virtual closet widget.

In one embodiment, a processor readable medium may be directed to managing an outfit, the processor readable medium comprising instructions that when executed by a processor cause the processor to perform actions. The actions may include providing an interface for managing a user's virtual closet comprising the outfit; receiving an item to be configured into the outfit; and providing the outfit configured with the item in response to a request for the outfit.

In one embodiment, the item is received as an image captured on a mobile device. In one embodiment, the item is received from a first member of a social network and the outfit is provided to second member of the social network. The actions may further include limiting an access of the outfit to a friend of an owner of the outfit within the social network.

In one embodiment, the actions may further include embedding a widget version of the interface within a webpage of a first web domain; and relaying commands for managing the virtual closet between the first web domain and a second web domain, wherein relaying comprises enabling cross-domain communication within a browser. In one embodiment, the actions may further include sharing the outfit by sending a message using a mobile device and posting to an external third-party webpage. In one embodiment, the actions may further include inspecting the item using a touch input.

In one embodiment, a processor readable medium is directed to managing an outfit over a network comprising instructions that when executed by a processor cause the processor to perform actions. The actions can include providing a virtual closet widget; and providing an activation component within the virtual closet widget to provide a selectable catalog of items that are configured to be added into the virtual closet widget. In one embodiment, the actions may further include providing a slideshow view for browsing a current selection item within a category of clothing while simultaneously displaying items before the current selection item and items after the current selection item within an ordering of items within the catalog, wherein the current selection item appears at the same scale as other items within the outfit. In one embodiment, the actions may further include receiving a request to copy at least one item from a member's virtual closet into a virtual closet of another member.

The invention also relates to a computer-implemented method, system, apparatus, and media for managing shopping. In one embodiment, a system includes a website that comprises an online catalog; and a personal digital closet that persists when a user exits to another part of the website. In one embodiment, the closet follows the user through the website. In one embodiment, closet items are configured to be transferred to a digital cart for purchase.

Another embodiment relates to a digital closet that displays user picked but unpurchased items when a user returns to an online retail catalog after previously exiting the website. In one embodiment, the digital closet is configured to automatically load purchased items into the closet. In one embodiment, the closet contains purchased and unpurchased items. In one embodiment, an item is configured to be added to the closet without selecting the item. In one embodiment, a cookie is used to recognize the user.

Another embodiment relates to a shopping tool for a retail website. The website includes an outfit creator; and a digital closet that is displayed in a window in association with the creator and is visible to the user and includes thumbnail images of purchased and unpurchased items, wherein the closet includes an option to access a catalog while the users is in the creator.

Another embodiment relates to a method for managing an outfit over a network. The method includes providing, over the network, a navigation of an electronic media source while simultaneously providing, over the network, a virtual closet widget representative of outfit data for display on at least one device; providing an activation component within the virtual closet widget to configure a panel for providing a selectable catalog of items that are configured to be added into the outfit data; and in response to adding an item, providing a visual indication of the item on the virtual closet widget, wherein the item comprises at least one unset attribute for setting through the virtual closet.

The method can further include providing a configuration component within the virtual closet for configuring the unset attribute of the item, if the item is marked as available within the catalog. In one embodiment, the items within the virtual closet comprise at least one purchased item, at least one unpurchased item from the catalog, or at least one unpurchasable item.

The method can further include receiving a drag-and-drop of the item from a plurality of portions of the electronic media source. The method can further include embedding the virtual closet within a webpage of a first web domain; and relaying commands for managing the virtual closet between the first web domain and a second web domain.

Another embodiment relates to a system for managing an outfit over a network. The system includes a closet datastore comprising outfit data representative of at least one outfit; and a virtual closet manager configured to perform actions. The actions include providing, over the network, at least one virtual closet widget representative of the outfit data for display on at least one network device; adding an item configurable within the outfit data to cause a visual indication of the adding to appear on the virtual closet widget.

The actions can further include providing, over the network, a navigation of an electronic media source while simultaneously providing at least one virtual closet widget, wherein the item is added from the electronic media source. In one embodiment, the electronic media source comprises a webpage.

In one embodiment, adding the item further includes receiving network data comprising a Uniform Resource Identifier (URI) representative of the item and a configuration of the item within the at least one outfit, wherein the URI is received from an electronic media source other than the electronic media source displaying the at least one virtual closet widget, and wherein the URI is provided in the electronic media source as a link attached to a multimedia item representative of the outfit.

The actions can further include personalizing an outfit based on style information about a user's clothing preferences. The system can further include a clothing item catalog of purchasable clothing items configured to provide a drill-down of a plurality of clothing items through a visual indication of the clothing item within at least one of the virtual closet widget.

Another embodiment relates to an apparatus for managing an outfit that includes a processor for performing actions. The actions can include providing, to a member, a widget interface for managing the member's virtual closet comprising the outfit; receiving an item to be configured into the outfit; and providing the outfit configured with the item in response to a request for the outfit. In one embodiment, the item is received as an image captured on a mobile device. In one embodiment, the item is received from a first member of a social network and the outfit is provided to second member of the social network, wherein the member and the other member are separated by at least two degrees of separation within the social network. The actions can further include embedding the widget interface within a webpage of a first web domain; and relaying commands for managing the virtual closet between the first web domain and a second web domain, wherein relaying comprises enabling cross-domain communication within a browser. One embodiment, relates to the method of performing the actions of the apparatus.

Another embodiment relates to a processor readable medium for managing an outfit over a network comprising instructions that when executed by a processor cause the processor to perform actions. The actions can include providing, over the network, a virtual closet widget comprising an outfit; and providing an activation component within the virtual closet widget to provide a selectable catalog of items that are configured to be added, into the virtual closet widget. The actions can further include limiting an access of the outfit within the virtual closet to a friend of an owner of the outfit within the social network. The actions can further include providing a slideshow view for browsing a current selection item within a category of clothing while simultaneously displaying items before the current selection item and items after the current selection item within an ordering of items within the catalog, wherein the current selection item appears at the same scale as other items within the outfit. The actions can further include sharing the outfit by sending a message to a mobile device, or posting to an external third-party webpage. The actions can further include receiving a request to copy at least one item from a member's virtual closet into a virtual closet of another member.

Another embodiment relates to a system for managing an outfit. The system can include a closet datastore comprising a data structure configured to store outfit data representative of at least one outfit, wherein the outfit data comprises at least one settable attribute; and a virtual closet manager configured to perform actions. The actions can include providing at least one virtual closet widget for adding at least one outfit item data to the closet datastore, wherein the outfit item is associated with a user in a social network, and wherein at least one of the settable attribute of the outfit data is unset when the outfit item data is added, and wherein the unset attribute is configured to be subsequently set based on a user input by the user; and enabling at least one outfit item configuration of at least one item of the outfit within the data structure. In one embodiment, the outfit item configuration is selected from at least one of sharing at least a portion of the outfit to another user associated with the user; suggesting another outfit item based on at least one attribute of the outfit item, characteristics of the user, and the social network; and configuring a plurality of items in the outfit based on a scheme or the other user.

Another embodiment relates to a method for an online retailer of garments and accessories to provide for shopping and purchasing of online catalog items via online platform. The method can include implementing a website for shoppers to access to view and purchase catalog items; providing a shopper with the opportunity to have four modes of interaction with the website, and providing a community tool that presents one or more options to a current shopper and transmits a message comprising a link corresponding to a particular outfit selected by the current shopper wherein the link pulls social contacts of a shopper into the website to view that particular outfit in the outfit canvas mode.

The website can include a catalog mode wherein a region displayed where a user can browse catalog items and select to take different actions with respect to the items including adding an item to a closet, an outfit canvas, or a shopping basket to finalize a purchase; a closet mode wherein shoppers can add items from the catalog to store the item indicating a state of added interest while the shopper stays in the website and wherein the shopper can add items from the closet to the shopping basket to finalize a purchase or select to remove items from the closet; an outfit canvas mode wherein individual shoppers can try out visual combinations and arrangements of items to coordinate and evaluate and wherein two or more items can be resized or moved on the canvas to allow the shopper to assemble various arrangements or combinations to aid in the evaluation of the items and further wherein a shopper can name and save an outfit comprising multiple items to be held in the closet; and a shopping basket mode wherein a shopper can add items to a basket that the shopper has decided to purchase at checkout.

In one embodiment, the community tool is implemented to store relationships between shoppers on the website. In one embodiment, the website provides access to information that is otherwise blocked based on relationship information of a current shopper to other shoppers on the website. In one embodiment, a shopper in the outfit canvas simultaneously has access to the close mode and catalog mode. In one embodiment, the closet mode provide access to items moved to the closet by that current shopper and to items moved by other shoppers to their closet during their shopping experience, wherein the other shoppers are in the current shopper's circle.

Another embodiment relates to a system for an online retailer of garments and accessories to provide for shopping and purchasing of online catalog items via an online platform. The system can include one or more computers and software implemented on the computers configured to provide a website for shoppers to access to view and purchase catalog items; provide a shopper with the opportunity to have four modes of interaction with the website, and provide a community tool that presents one or more options to a current shopper and transmits a message comprising a link corresponding to a particular outfit selected by the current shopper wherein the link pulls social contacts of a shopper into the website to view that particular outfit in the outfit canvas mode.

The website can provide a catalog mode wherein a region displayed where a user can browse catalog items and select to take different actions with respect to the items including adding an item to a closet, an outfit canvas, or a shopping basket to finalize a purchase; a closet mode wherein shoppers can add items from the catalog to store the item indicating a state of added interest while the shopper stays in the website and wherein the shopper can add items from the closet to the shopping basket to finalize a purchase or select to remove items from the closet; an outfit canvas mode wherein individual shoppers can try out visual combinations and arrangements of items to coordinate and evaluate and wherein two or more items can be resized or moved on the canvas to allow the shopper to assemble various arrangements or combinations to aid in the evaluation of the items and further wherein a shopper can name and save an outfit comprising multiple items to be held in the closet; and a shopping basket mode wherein a shopper can add items to a basket that the shopper has decided to purchase at checkout.

In one embodiment, the community tool is implemented to store relationships between shoppers on the website. In one embodiment, the website provides access to information that is otherwise blocked based on relationship information of a current shopper to other shoppers on the website. In one embodiment, a shopper in the outfit canvas simultaneously has access to the close mode and catalog mode. In one embodiment, the closet mode provide access to items moved to the closet by that current shopper and to items moved by other shoppers to their closet during their shopping experience, wherein the other shoppers are in the current shopper's circle.

Another embodiment relates to a method for providing a shopping experience to general users via a website. The method can include providing four modes of interaction with the website wherein each mode is distinguishable with respect to the purpose of the mode, the product items that are available for interaction, and the set of interactions that are available to individual users, wherein one of the modes comprises a personal closet in which individual users can hold a plurality of outfits for further consideration before adding an outfit or items in an outfit to a shopping basket for checkout; and providing an option to shoppers where they can share their closet with their others by establishing relationships within the website.

The method can further include sending a message to inform one or more people of a particular outfit in a user's personal closet and providing within the message a link that pulls the recipient to the website to be able to view the outfit.

In one embodiment, the link pulls the recipient to an interactive outfit canvas in the website displaying the outfit and from which the recipient also has access to the personal closet and an online catalog to revise the outfit within the canvas.

In one embodiment, the recipient is also provided options to submit feedback to the outfit which is stored on the website and available to a creator of the outfit.

One embodiment is directed to a system for providing a shopping experience to general users via a website. The system can include one or more computers on which software is implemented, wherein the computer and software are configured to provide four modes of interaction with the website wherein each mode is distinguishable with respect to the purpose of the mode, the product items that are available for interaction, and the set of interactions that are available to individual users, wherein one of the modes comprises a personal closet in which individual users can hold a plurality of outfits for further consideration before adding an outfit or items in an outfit to a shopping basket for checkout; and provide an option to shoppers where they can share their closet with their others by establishing relationships within the website.

In one embodiment, the computer and software is configured to send a message to inform one or more people of a particular outfit in a user's personal closet and providing within the message a link that pulls the recipient to the website to be able to view the outfit. In one embodiment, the link pulls the recipient to an interactive outfit canvas in the website displaying the outfit and from which the recipient also has access to the personal closet and an online catalog to revise the outfit within the canvas. In one embodiment, the recipient is also provided options to submit feedback to the outfit which is stored on the website and available to a creator of the outfit.

The invention also relates to a computer-implemented method, system, apparatus, and media for online shopping. The method can include providing a digital closet co-located with a catalog for shopping items; receiving an invocation of a canvas through a interface element within the closet; replacing the catalog with the canvas; and enabling creation of an outfit with at least items from the closet in the canvas, wherein the created outfit is simultaneously stored within the closet.

The method can further include providing a video, wherein at least one timeframe of the video is associated with at least one of the shopping items; providing a hover box of the item at the timeframe; and receiving a selection in the hover box to add the at least one of the shopping items to the closet. In one embodiment, enabling creation of the outfit further includes relayering an item in the canvas with respect to another item in the canvas. The method can further include invoking a hover menu over an item within the closet, catalog, or canvas.

One embodiment is directed to a system for online shopping. The system can include a computer component configured to perform actions comprising the steps providing a digital closet co-located with a catalog for shopping items; receiving an invocation of a canvas through a interface element within the closet; replacing the catalog with the canvas; and enabling creation of an outfit with at least items from the closet in the canvas, wherein the created outfit is simulta- neously stored within the closet. The system can further include another component in communications with the computer component configured to send requests to modify the closet, canvas, or catalog.

One embodiment is directed to an apparatus for online shopping. The apparatus can include a computer component configured to the steps providing a digital closet co-located with a catalog for shopping items; receiving an invocation of a canvas through a interface element within the closet; replacing the catalog with the canvas; and enabling creation of an outfit with at least items from the closet in the canvas, wherein the created outfit is simultaneously stored within the closet.

One embodiment is directed to a processor readable media for online shopping, comprising instructions executable by a processor to perform the providing a digital closet co-located with a catalog for shopping items; receiving an invocation of a canvas through a interface element within the closet; replacing the catalog with the canvas; and enabling creation of an outfit with at least items from the closet in the canvas, wherein the created outfit is simultaneously stored within the closet.

BRIEF DESCRIPTION OF THE DRAWINGS

The nature and various advantages of present inventive systems, methods, or media will become more apparent upon consideration of the following detailed description, taken in conjunction with the accompanying drawings, in which like reference characters refer to like parts throughout, and in which:

FIGS. 1A-1F show examples of interfaces and processes for managing an outfit in accordance with one or more embodiments of the invention;

DETAILED DESCRIPTION

Figure 1A:
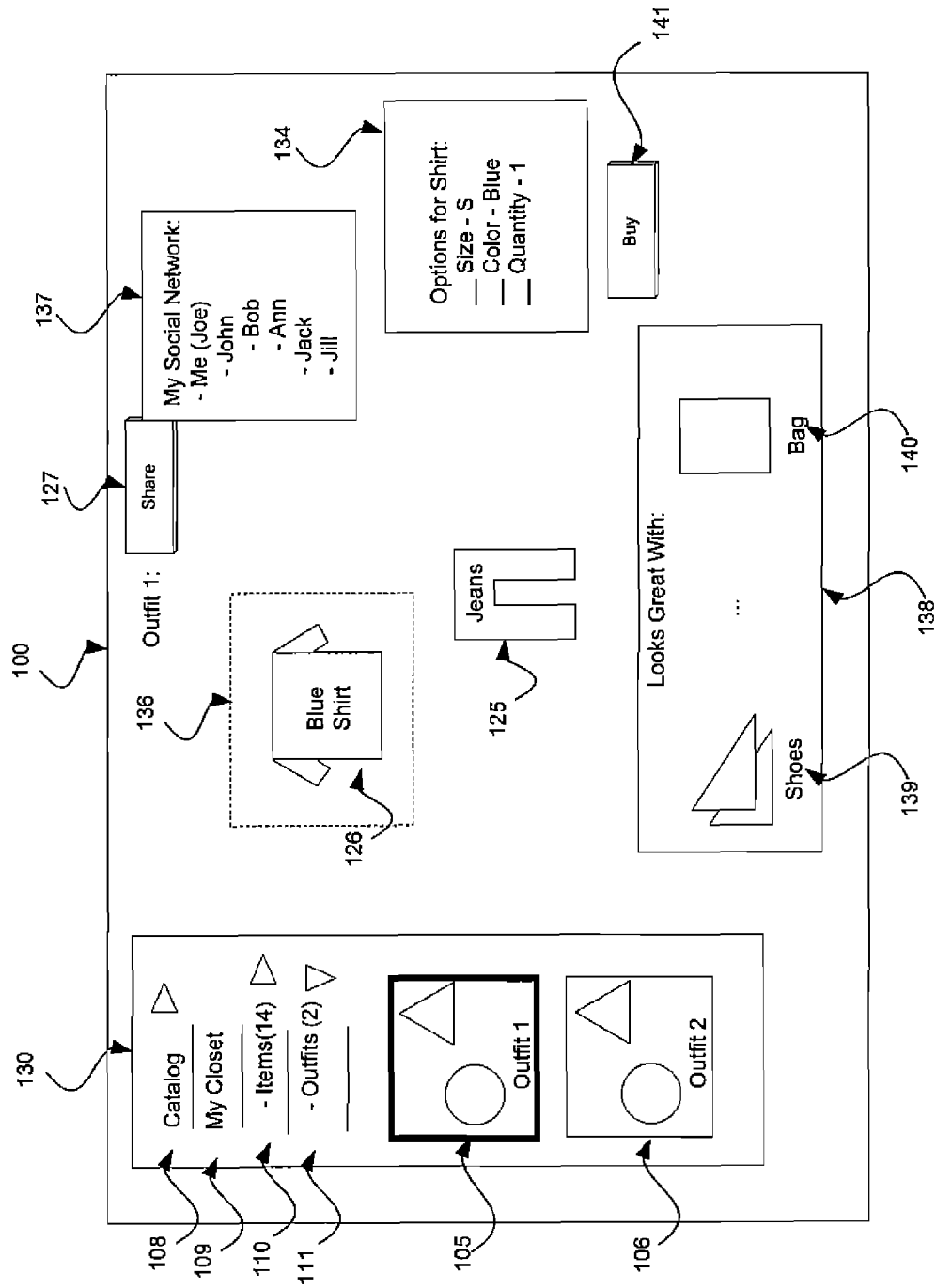

Features and tools to advance the user shopping experience are provided. For example, a user may be provided with a shopping closet that provides a place where a user can hold items of interest while shopping. For example, the user can hold items in that container such that they continue to be in the closet when the user, for example, leaves and returns to shopping. A shopping closet can provide the user with the option to add an item from an online catalog to the closet (e.g., simply by drag and drop). The addition can be implemented to be available without even requiring the user to select any item parameters.

A shopping closet can also interface to a shopping cart or basket. A user can move or add an item or outfit from the shopping closet to the basket. The selection can indicate the user's decision to move the level of interest to one of buying the item. In so doing, the user may for example be required to select personal parameters to be able to add the item to the cart or may be required to do so at the time of completing the transaction.

A shopping closet can be configured to store an outfit or individual products. The shopping closet can also provide a visual thumbnail of products or outfits to refresh a user's memory. If desired, selecting an outfit from the catalog, the closet, or other location can take a user directly to a canvas. At the canvas, the user can be provided with the opportunity to view combinations of items so as to create an outfit, coordinate items, or save an outfit to the shopping closet. This tool, among others, can be advantageous in providing users the flexibility to reflect on a selection while shopping by for example deciding on its combination with other items (e.g., items in the catalog, in the closet, previously purchased items, items from other retailers, etc.). Another advantage that can be provided is to allow access by way of the closet or related container to previously purchased and new items selected during shopping. This gives greater ability to accessorize. Other advantages or features are also provided which, for example, include features directed to widgets and social networking:

A closet may be used for an online clothing or retail website. The website may include an online catalog. The personal digital closet may persist when a user exits a website or moves from one part of the website to another. In one preferred embodiment, a shopping tool for the retail website may include an outfit creator and a digital closet that is displayed in a window in association with the outfit creator. The digital closet may be visible to the user and may include thumbnail images of purchased and unpurchased items. The closet may include an option to access a catalog while the users is in the creator.

The invention is generally directed to systems, methods, or media is directed, among other things, to a personal digital closet are provided. For example, a personal digital closet can persist when a user exits a website comprising an online catalog to another part of the website. Embodiments can include providing a shopping tool for a retail website comprises an outfit creator; and a digital closet that is displayed in a window in association with the creator and visible to the user and includes thumbnail images of purchased and unpurchased items, wherein the closet includes an option to access a catalog while the users is in the creator. A navigation of an electronic media source can be provided while simultaneously providing the virtual closet. Embodiments can also include an activation component is provided within the virtual closet widget to configure a panel for providing the selectable catalog. In response to adding an item, a visual indication is, for example provided of the item on the virtual closet. In one or more embodiments, the item may include at least one unset attribute. Features are directed to tools for improved user experience including features related to closets, canvas, or relationship tools.

FIGS. 1A-1F show examples of interfaces and processes for managing an outfit. The interfaces shown may be or may be components of a webpage, a standalone application, a plug-in, a window, or the like. The interfaces may be displayed on a device, such as devices 402, 420, 430-431 of FIG. 4. The interfaces of FIGS. 1A-1F may be used to enable the process of FIG. 3.

FIG. 1A includes interface 100 usable for managing a virtual closet. Interface 100 includes an outfit canvas for managing an outfit (e.g., "Outfit 1") and a plurality of panels adjacent and/or co-located with the outfit canvas, such as management panel 130, suggestion panel 138, and options panel 134. The canvas enables placement of a plurality of clothing and/or accessory items, including items 125-126. Items 125-126 may be thumbnail images of clothing or accessory items. Interface 100 also has a plurality of controls for managing the items, outfit, or virtual closet, including share button 127, social network selection drop down 137, and buy button 141.

Management panel 130 includes a plurality of activation components 108-111. Component 108 enables displaying a catalog of purchasable items. The catalog may be any configuration of data, including a hierarchical configuration, linear configuration, or the like. Component 109 enables displaying outfits or items in a user's virtual closet. Component 110 enables displaying the items in the user's virtual closet. And, component 111 enables displaying the outfits in the user's virtual closet. The components may display the amount of items or outfits under each category. When selected, the activation components modifies an area of the display such as the lower portion of management panel 130. As shown, component 111 is selected and the current outfits 105-106 in the user's closet is displayed. Outfits 105-106 may be thumbnail images of the outfit configuration. Outfit 105 is selected and the outfit is displayed within the canvas of interface 100. In one embodiment, outfit 105-106 may be rated. The rating may be a star rating, numeric rating or the like. Friends of the owner of the outfit may rate the outfit, using a user interface. In one embodiment, the rating may be based on the amount of time or number of times the outfit has been seen on the website by another user. In one embodiment, reward points may be given based on the rating to the owner of the outfit. The reward may be money, points, discounts for purchasing items, or the like.

The outfit canvas enables dragging-and-dropping items from a visual indication of an item into the canvas. For example, the canvas enables dragging-and-dropping items 139-140 from suggestion panel 138 into the canvas. In another example, the user may drag and drop items from a link relating to an item, an image, such as a fashion shot, an movie poster, etc. of models wearing the items or which includes the items, or the like. The canvas enables placement, overlaying, and other arrangement of the items. As shown, item 126 is currently selected and is being dragged-and-dropped.

Configure control 136 enables the user to resize, skew, flip, or otherwise model the visual representation of the item. Configure control 136 may be a mouse/keyboard interactive interface. Placement of items into the canvas of the outfit enables adding the item to a data representation of the outfit and persists the modified data representation of the outfit for later configuration, sharing, and/or purchase. For example, the user may exit a multimedia content such as a webpage, by, for example, closing a browser, indicating logging-out, or the like. The user may then return to the website and the persisted data remains associated with the user and provided to the user.

As shown, options panel 134 includes at least one attribute about an item within the canvas and enables editing the attribute. In one embodiment, an item that is added to the outfit may include at least one unset attribute (e.g., color, size, fabric, pattern, etc.). The attribute may be determined to be unset if, for example, the fields in a data structure for the attributes are set to an empty pattern, string, or data or any other data indicating that the attributes are not yet set. At least some attributes are configured to be set before being purchase. For example, a size of a shirt is configured to be set before purchase. Also, at least some attributes may be automatically set for the user. A configuration engine may use statistics about the user's buying pattern to set the attributes. For example, a user who often wears small shirts will have their size attribute for shirts set to small. The item may be added, placed, organized, or configured in the outfit without setting the unset attribute before adding the item. The unset attributes may be set within the outfit creator and/or during the purchasing of the items (e.g., as part of the outfit or individual item). To add an item to a canvas and/or a closet, a user may simply be able to drag and drop an item (or, e.g., double click on an item) without setting another items specific parameters. This can provide a fluid shopping tool for speeding the use of the site.

In one embodiment, option panel 134 may also provide suggestions for possible selection of attributes of an item or set of items. Option panel 134 may provide a color scheme, style scheme (e.g., grunge, hip-hop, youthful, etc.), pattern scheme (e.g., plaid, dotted, etc.) for a clothing or even a plurality of clothing items in an outfit. For example, the optional panel 134 may detect that the time of year is autumn, and that user chooses female clothing items from usage patterns, and may suggest female preferred autumn colors for the current clothing items. A color scroller, such as a color wheel may also be provided for the user to select through a plurality of color or an at least one item in an outfit.

Suggestion panel 138 may be configured to provide items that the user may be interested in based on the recorded or otherwise known behavior of the user, demographic of the user, a preference for an item or combination of items with the outfit or closet of the user, an item previously selected or visited by the user, a season, location of purchase, time of year, or the like, such that the suggested item is configured to be more likely to be selected by the user to be added to an outfit or otherwise purchased. Algorithms for providing suggestions may include clustering user's characteristics and preferred items to create a plurality of groups of user/items. A matching algorithm may find the closest matching group for a particular user visiting the website (e.g., shortest average distance in user characteristic space), and provide the suggested item for that user/items group. Other suggestion algorithms, such as neural networks, decision trees, or the like, may also be used.

In one embodiment, suggestion panel 138 may provide clothing items that matches another user's clothing items that are in the other user's closet. For example, a couple may wish to have matching shirts, his/hers shirt, or the like. Best friends may wish to wear matching clothes. An indication may be presented below the suggested item (e.g., "your boyfriend has this matching shirt"). By such techniques, one or more people can coordinate outfits such as on the same canvas. Such relationship between users may be stored in the social network and used by a suggestion engine to provide the matching items.

Share button 127 enables providing an item, outfit, or closet of the user to another user. In one embodiment, a particular item or outfit to be purchased may be selected to be shared. In one embodiment, the outfit being currently managed is shared. In one embodiment, the other user may be within the social network of the user. In one embodiment, a social network may comprise data representing an interrelation between members such that the members may be connected by one or more degrees of separation (e.g., friends, friends of friends, etc.). A member or user of the social network may be able to interact with each other based on the degrees of separation. Social network selection drop down 137 may be used to select the other user to whom the item, outfit, or closet is shared. In one embodiment, sharing may comprise sending a message on the retail website to a friend who is currently on the retail website, emailing, sending via SMS, posting on a website, or otherwise providing the item, outfit, or closet. In one embodiment, activation of the share button 127 may cause a signal to be sent, data to be saved, or the like to indicate or otherwise cause the providing of the item, outfit, or closet, in real-time, or scheduled for a later time. Interfaces 174 and 175 of FIGS. 1E-1F respectively show processes and interfaces for sharing the outfits using a third-party media for display.

Buy button 141 enables purchasing an item, outfit, or closet. The item or outfit to be purchased may be selected or pre-configured (e.g., a current outfit). The purchasing may comprise setting unset attributes of the items. The items/outfits may be placed on a virtual cart or cart, shipping information and/or credit card information may be gathered for payment, taxes may be computed, and a signal or data may bet set or sent to indicate that the purchased items or outfits are to be sent to a purchaser.

Figure 1B:
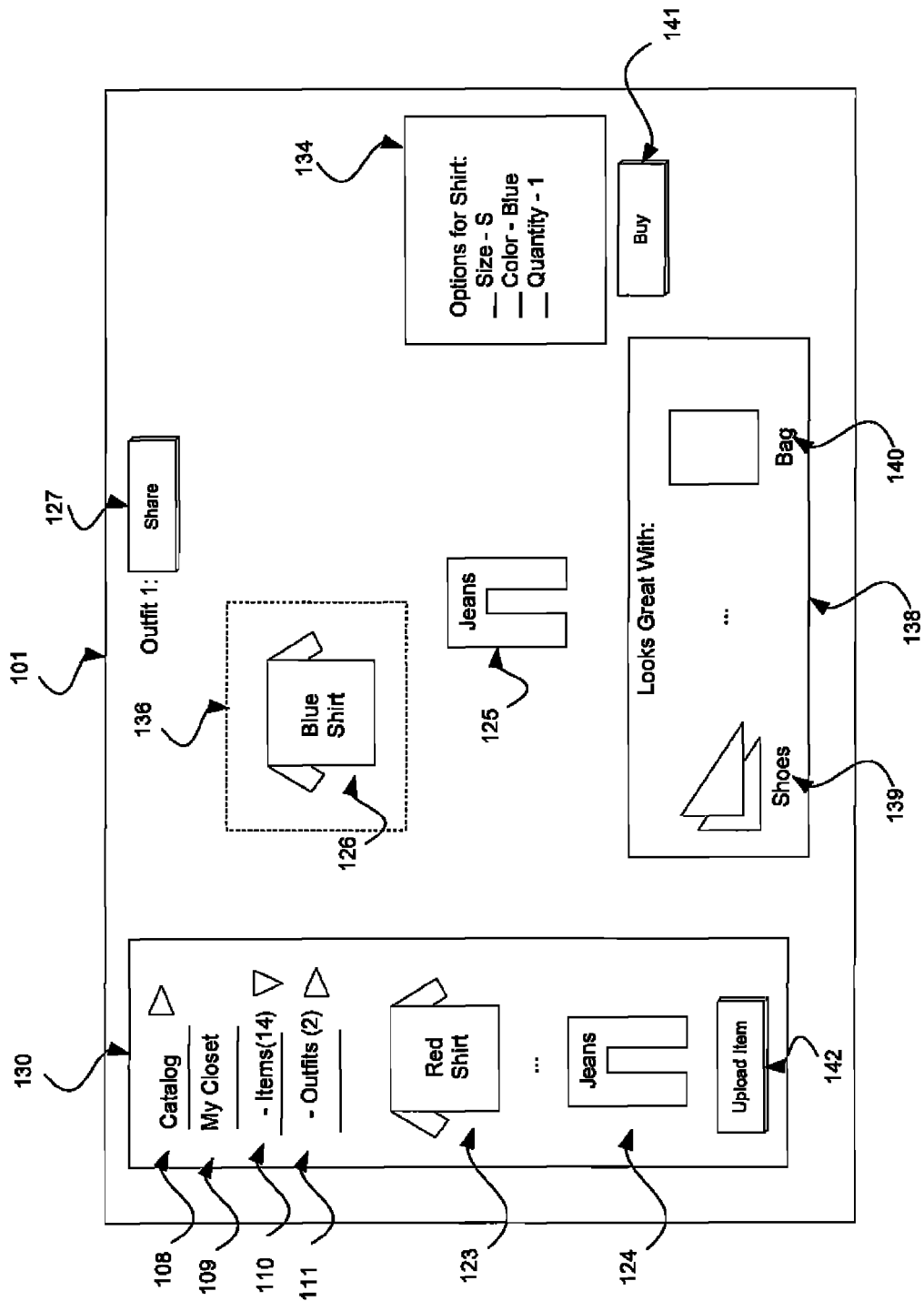

FIG. 1B shows interface 101 which is substantially similar to interface 100, except management panel 130 shows component 110 selected and the items available 123-124 available for selection. The user can drag-and-drop items 123-124 into the current outfit, thereby modifying the outfit. In one embodiment, the drag-and-drop may be enabled by asynchronous JavaScript and XML (AJAX), Flash, Java, Dynamic Hyper Text Markup Language (D/HTML) components or other components for providing rich interaction within a multimedia content such as a webpage.

The items may be purchased, unpurchased, unpurchasable, or purchasable items. An item may be indicated as purchased, unpurchased, or unpurchasable based on fields in a data structure or database associated with the item. An item that was previously purchased by the user may be marked as purchased. An item that is within a catalog but which has not been purchased is marked as unpurchased. An unpurchasable item may be an item that is associated with the user but not available with in the catalog (e.g., no longer available, or associated with items not provided by a merchant including uploaded items—images of clothes and accessories from a user's computer). The items may be items that were previously purchased by the user which the user selected to be added or which the user did not select to be added but which were automatically added. The items may be purchased online or at a brick-and-mortar store by the user. Thus, for example, the use can aggregate persisted content or closet in the context of a changing configuration.

Items may also be uploaded using upload item button 142. A user may upload an item from a hard drive, a mobile phone (e.g., captured using an Input/Output component such as a camera), or the like. The uploaded items appear within the display 130 and is added to data representing items associated with the user.

Figure 1C:
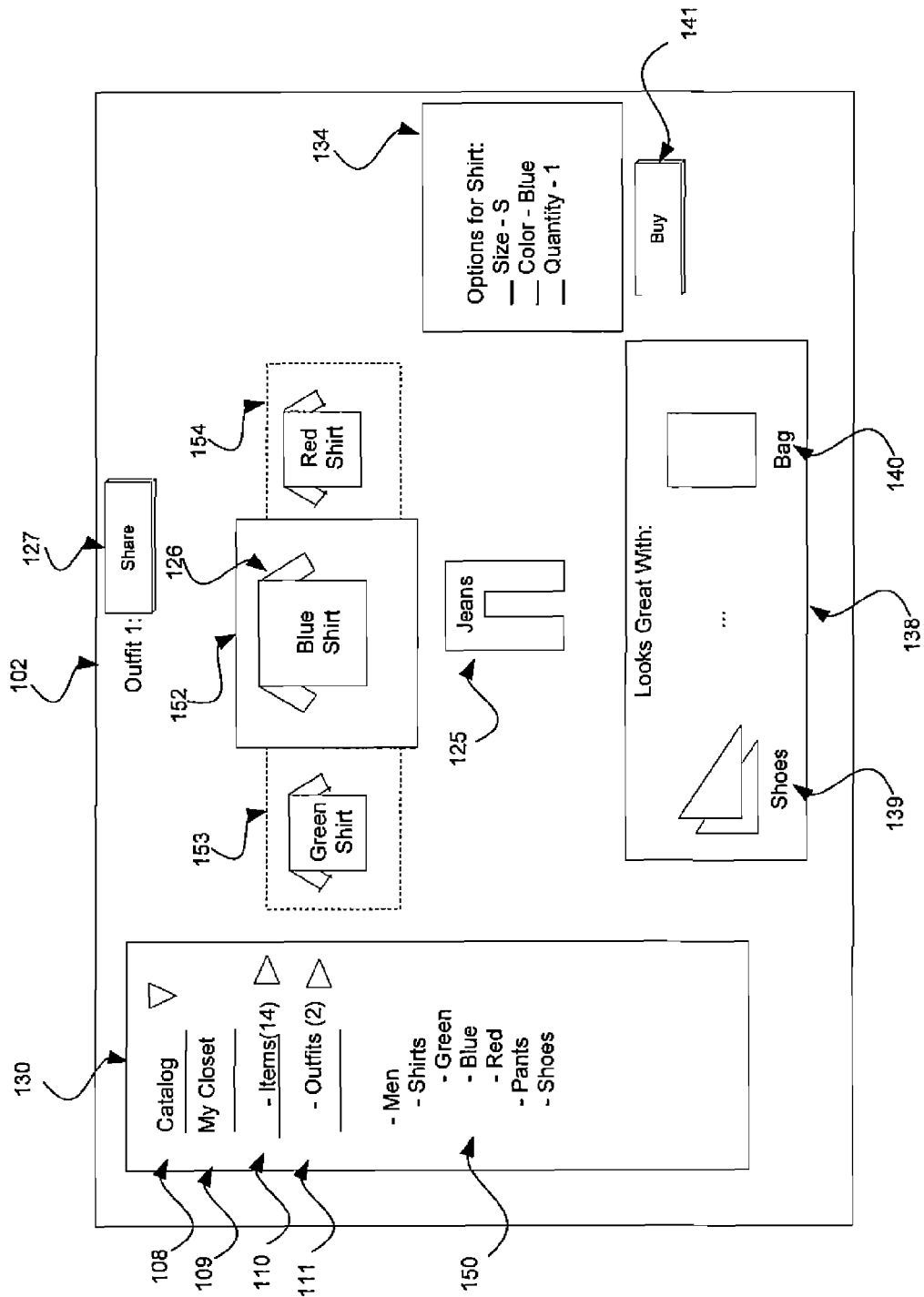

FIG. 1C shows interface 101 which is substantially similar to interface 100, except component 108 is selected. Selecting activation component 108 causes the catalog of items of purchasable items 150 to be displayed within panel 130. In another embodiment, selecting activation component 108 may cause another panel to appear for selecting an item from the catalog. The items of the catalog may or may not be in the items list of the user. The catalog may be updated periodically, be tailored to the particular user, geographic region, or the like. The user may drag-and-drop an item (e.g., visual indication representing the item such as "Men->Shirts- >Blue") onto the canvas to add the item into the outfit. In this way, browsing of the catalog may be enabled adjacent and/or co-located with the outfit creator canvas.

Browsing of the catalog within the outfit creator canvas may also be enabled using other graphical user interface (GUI) elements, such as a slideshow view panel. In one element, selecting activation component 108 may launch the slideshow view panel (e.g., elements 152-154) for selecting an item from a catalog. In another embodiment, selecting an item on the outfit canvas (e.g., right click on the item and select "browser") causes the slideshow view panel to appear. As shown, elements 152-154 comprises the slideshow view panel, wherein a currently selected item (e.g., blue shirt 126) is highlighted by box 152 and surrounded by items 152-154 to the left and right side, wherein the items to the left side are items earlier in a list of the items in the catalog, and items to the right are items later in the list. The items 153-154 are non-selected (but selectable) items and may be shown as smaller icons then the current selected item 152/126. Scrolling may be performed by sliding the mouse left or right, clicking on the left or right items, or the like. While the items are shown to the left or right, other configurations such as vertical, circular, multiple slanted views to the left or right, or the like, may also be used.

Figure 1D:
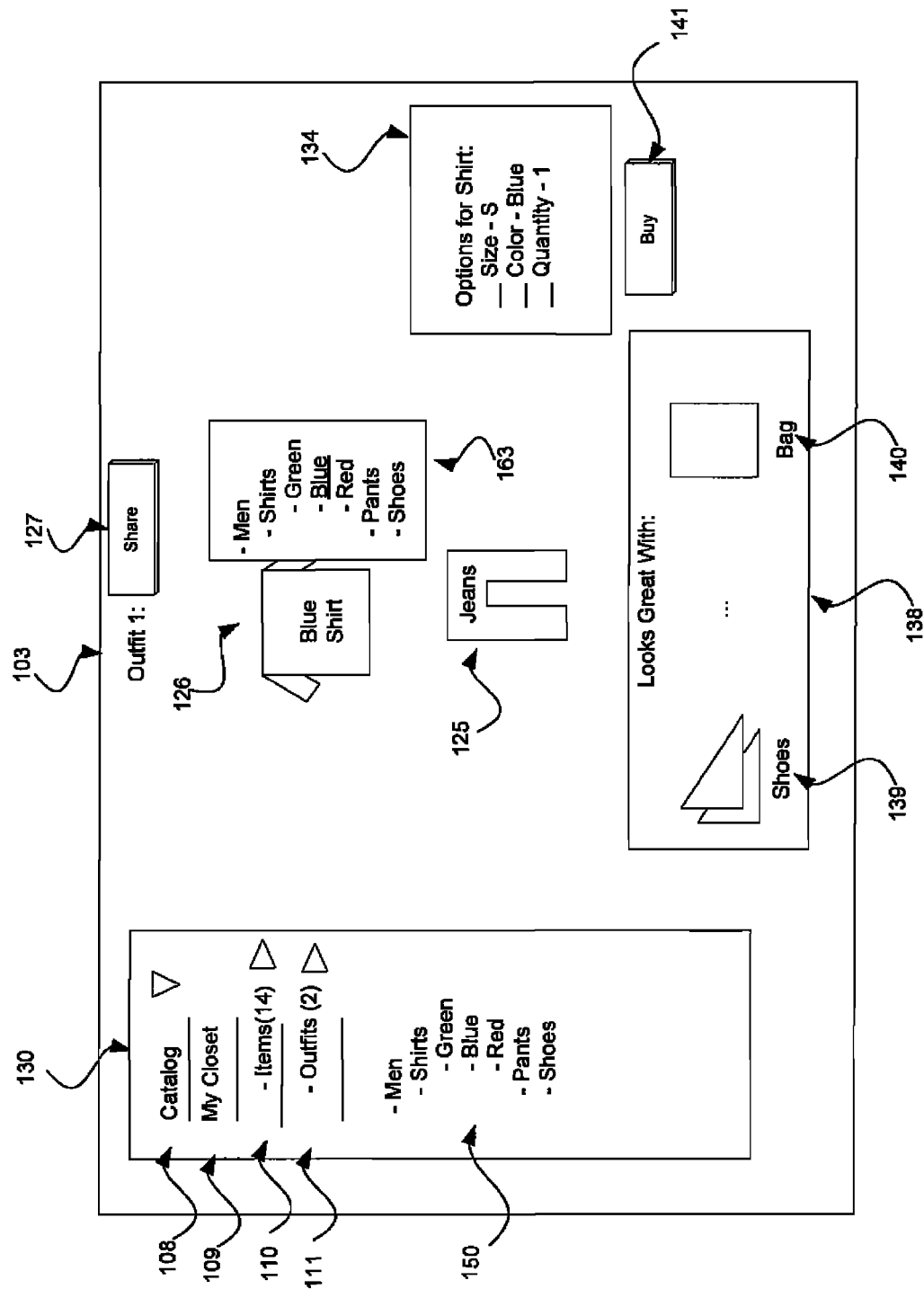

Drop down list 163 of the catalog as shown in FIG. 1D may also be used as another GUI for adding an item into the outfit. As shown in interface 103, the current item within the catalog may be highlighted, and the user may scroll up or down the catalog to change an item or add an item. The user may right click at a position within the outfit creator canvas to launch drop down list 163 and add an item at the clicked position.

Figure 1E:
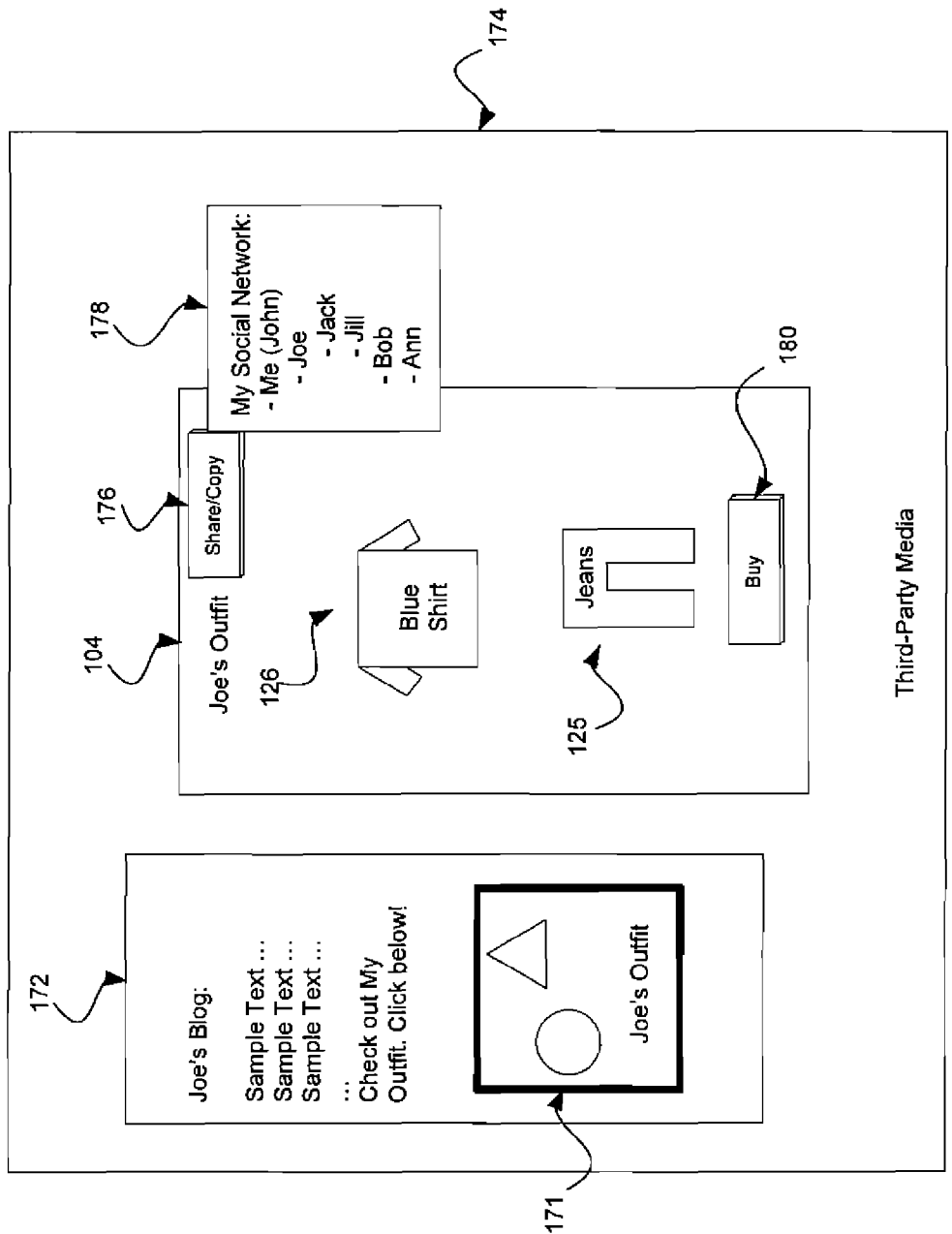

FIG. 1E shows a third-party media such as a third-party website 174, which includes interface 104, blog content 172, link item 171. The blog content 172 may be any content, including a social networking data (e.g., showing posts to friends, sharing of video, etc), text content, multimedia content (e.g., HTML, video (Flash), links), or the like.

Link item 171 may cause interface 104 to appear, be activated, or otherwise launched. In another embodiment, link item 171 may cause navigation to at least one of interfaces 100-103 for managing the identified outfit. Navigation may comprise clicking on links to bring up subsequent media (e.g., webpages), providing links, submitting content and receiving subsequent media, or the like.

Interface 104 is configured for managing and providing an outfit. In one embodiment, interface 104 is configured to receive information from a server other than the server providing the other content of third-party website, to enable, for example, cross-domain communications. In one embodiment, interface 104 may be a widget or any other plug-in, add-on, embedded code, or the like. In one embodiment, interface 104 may be a widget that is published to the third-party website, via cutting and pasting HTML/Javascript code into a webpage, editing a wiki, a blog, modifying data fields of a database to enable displaying the widget or the like. In one embodiment, interface 104 may use substantially the same source code and/or application programming interface (API) as the interfaces 100-103 to provide, among other things, management of the outfit. In one embodiment, interface 104 enables viewing and/or managing items 125-126 of the outfit (e.g., adding new items, removing items, sharing an outfit, purchasing the outfit, configuring set and unset attributes of items, and/or laying out the items in the outfit).

A visitor to third-party media 174 may share the outfit by activating share/copy button 176. Social network panel 178 shows that the visitor member is "John", and he is in the owner of the outfit/Joe's social network. The member can copy the outfit to his own virtual closet (and if he does not have a virtual closet, one may be created for him). The member may also share the outfit with one of his friends, friend's friend, etc. Interface 104 also enables the visitor member to buy the outfit by activating buy button 180. In one embodiment, the activation causes a cart for the visitor member to be filled with the items of the outfit and/or enables configuring the items for purchase.

In one embodiment, the visitor may be provided different combinations of the same outfit (e.g., different pants with the same shirt, different shirts with the same pants, etc). The visitor may select to view different versions of the same outfit side by side using, for example, a button, selection box, or the like. For example, outfit 104 may be displayed side by side with another outfit with similar items.

FIG. 1F shows third-party media 175 which is substantially similar to third-party media 174 except the visitor member does not have permission to see the outfit (e.g., owned by a member of a social network). In one embodiment, clicking on item 171 causes panel 190 to appear to inform the visitor that the visitor is not within a close enough proximity in the social network to the owner member (e.g., is four or more degrees of separation from the owner member). The visitor member may request to view the outfit and/or become friends with (a first degree connection in the social network) with the owner member by activating button 192.

Figure 2A:
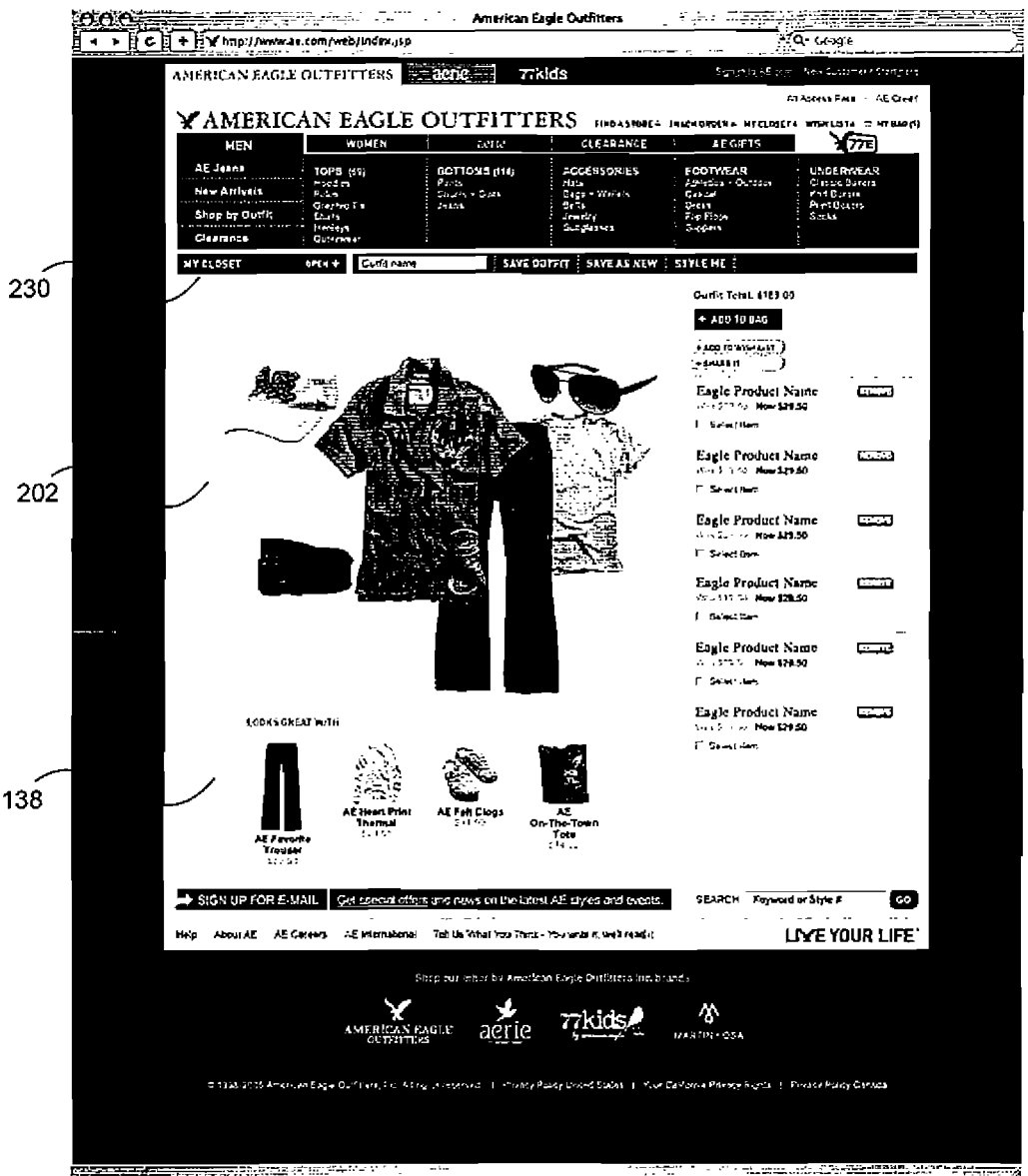
FIGS. 2A-2K show other examples of interfaces and processes for managing an outfit in accordance with one or more embodiments of the invention.

FIGS. 2A-2K show examples of interfaces and processes for managing an outfit. FIGS. 2A-2K an alternate embodiment of the process and mechanisms shown in FIGS. 1A-1F for managing the outfit. As shown in FIG. 2A, my closet button 230 provides a mechanism for providing a user's virtual closet. Outfit 202 shows a plurality of items for at least one associated with the user. Suggestion panel 138 provides suggestions of other items based on the user and/or the items in outfit 202.

Figure 2B:
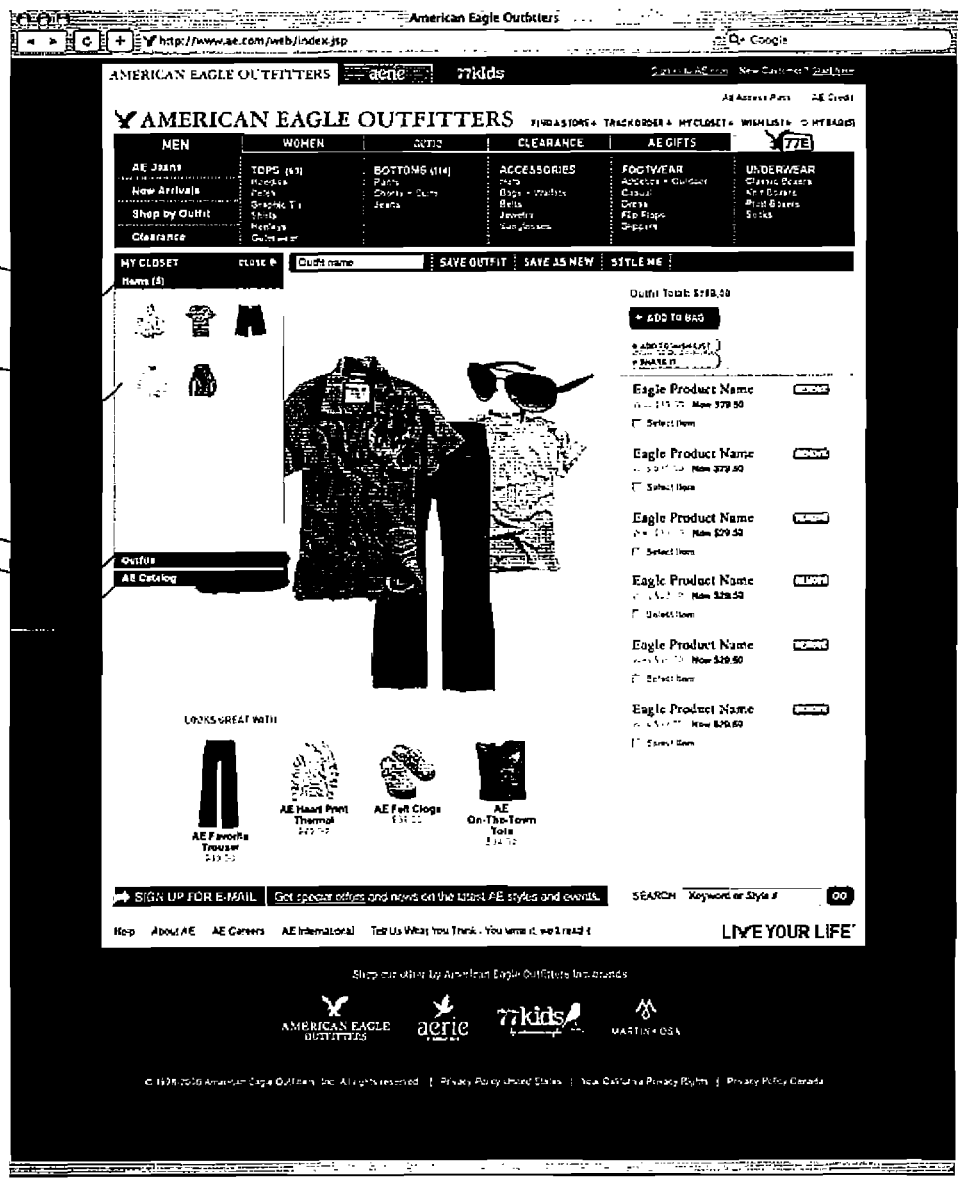

As shown in FIG. 2B, the user has selected my closet button 230. A menu is activated providing items components 110, 130, 111, and 108 for managing items, outfits, and/or catalogs of items, as described in conjunction with FIGS. 1A-1F.

Figure 2C:
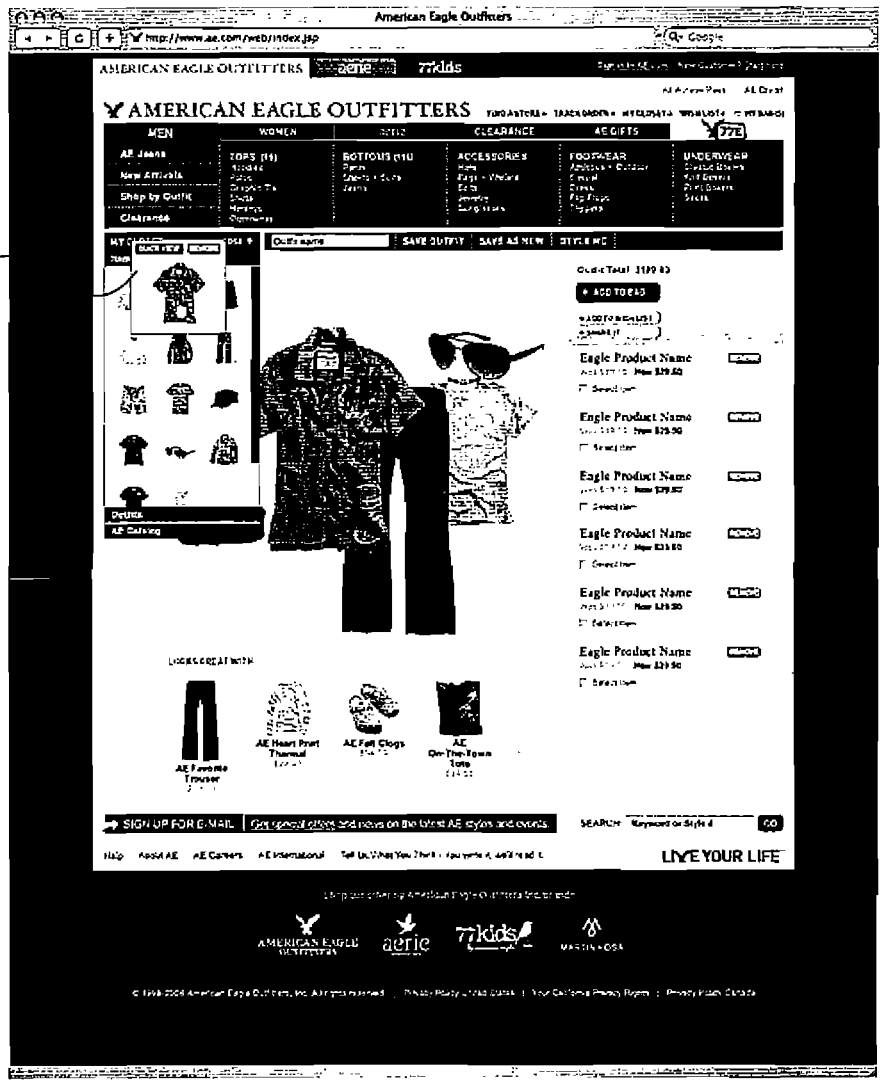
Figure 2D:

As shown in FIG. 2C, a particular item 123 of a user's items is highlighted and enabled to be expanded to provide more details about the item 123, and/or to remove item 123 from the user's items. In FIG. 2D, expanded item characteristics 223 is provided after the user selects to expand item 123's view.

Figure 2E:
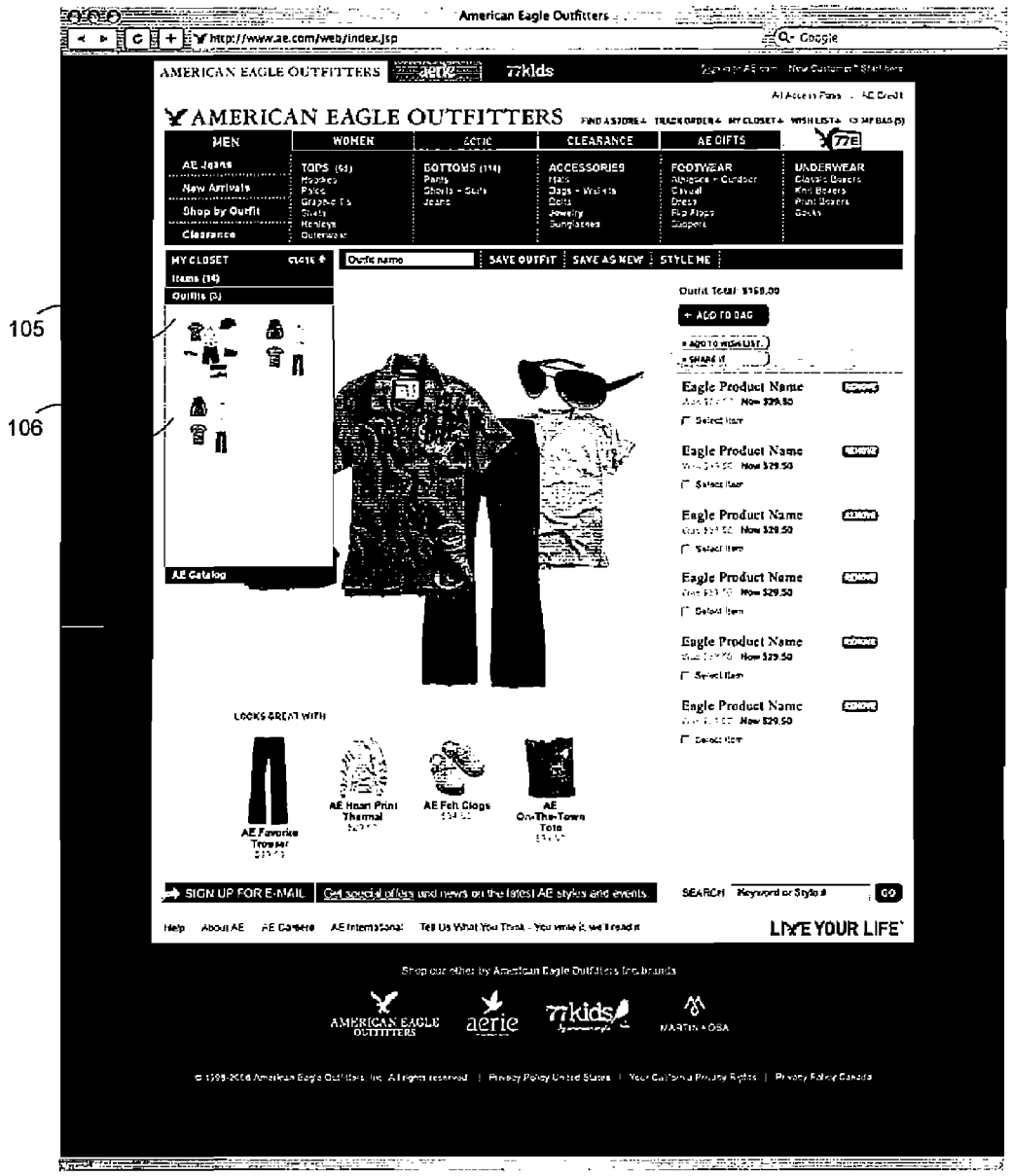
Figure 2F:
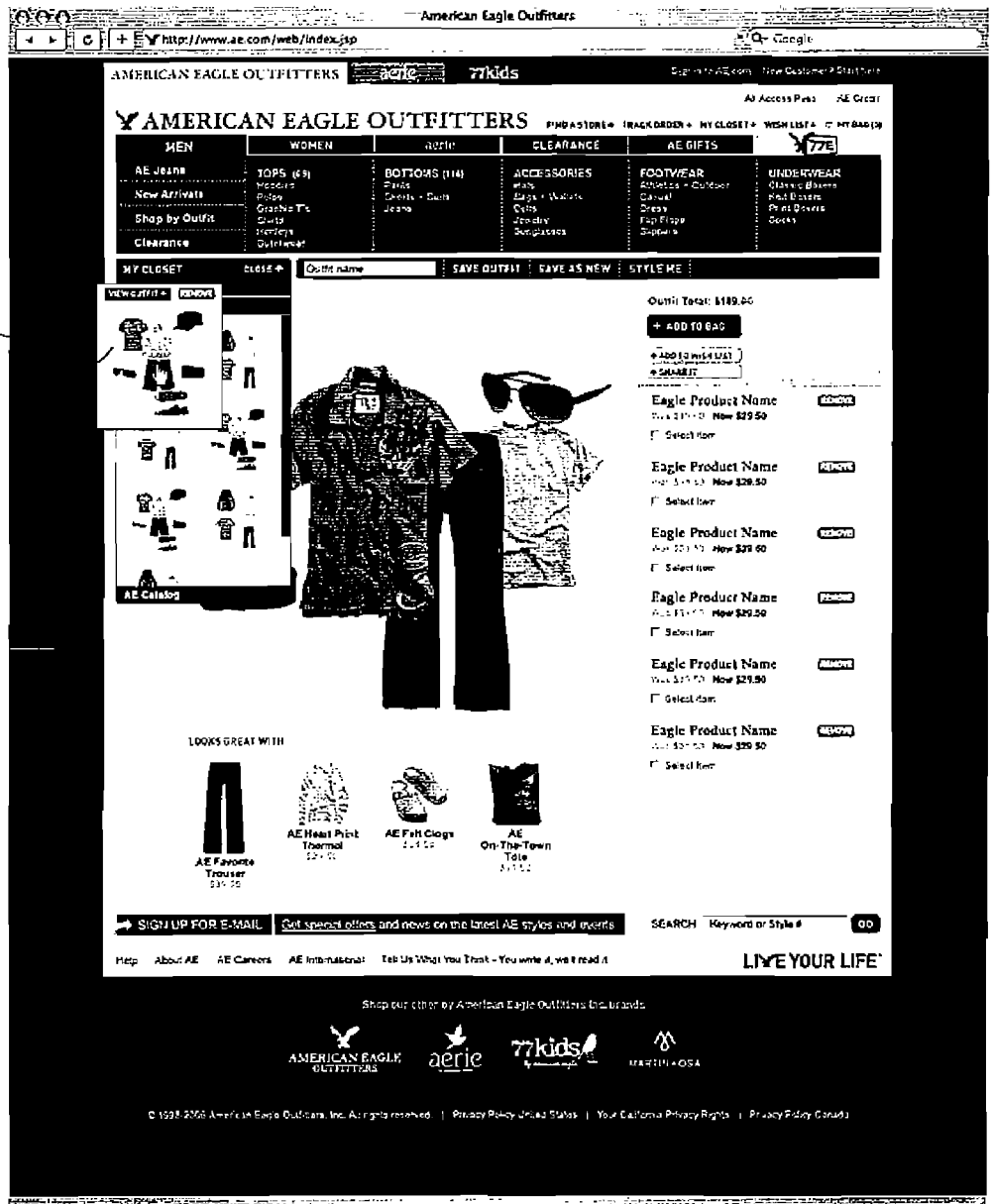

As shown in FIG. 2E, outfits 105-106 of the user are shown. FIG. 2F shows a particular outfit 205 of a user and enables viewing more details about the outfit and/or removing the outfit. Selecting to view the outfit may change the outfit shown 202 to the selected outfit.

Figure 2G:
Figure 2H:
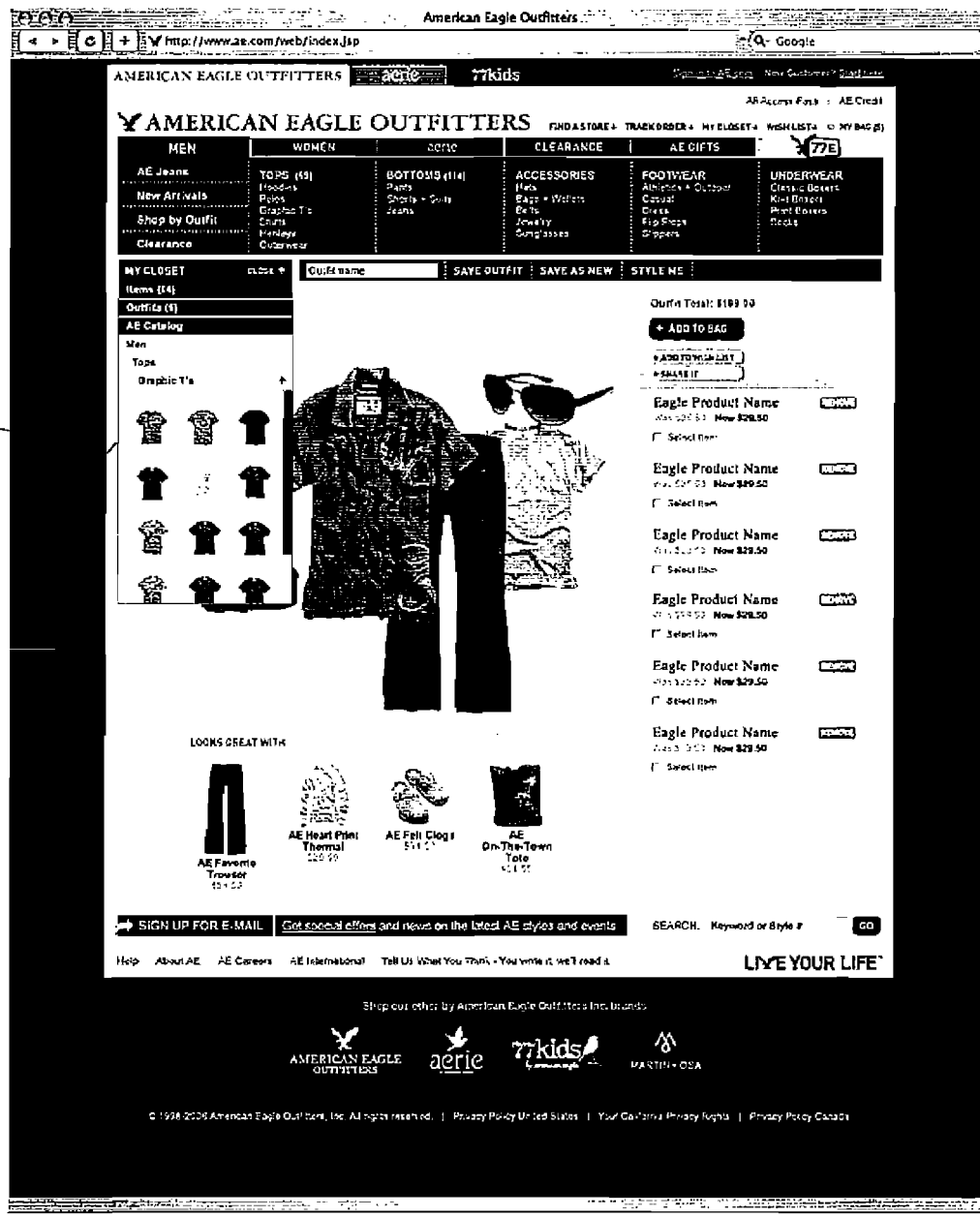

As shown in FIG. 2G, a catalog of items 105 is shown. The catalog may be navigated in a hierarchical manner as described above in conjunction with FIGS. 1A-1F. FIG. 2H shows catalog 150 with icons of purchasable items.

Figure 2I:
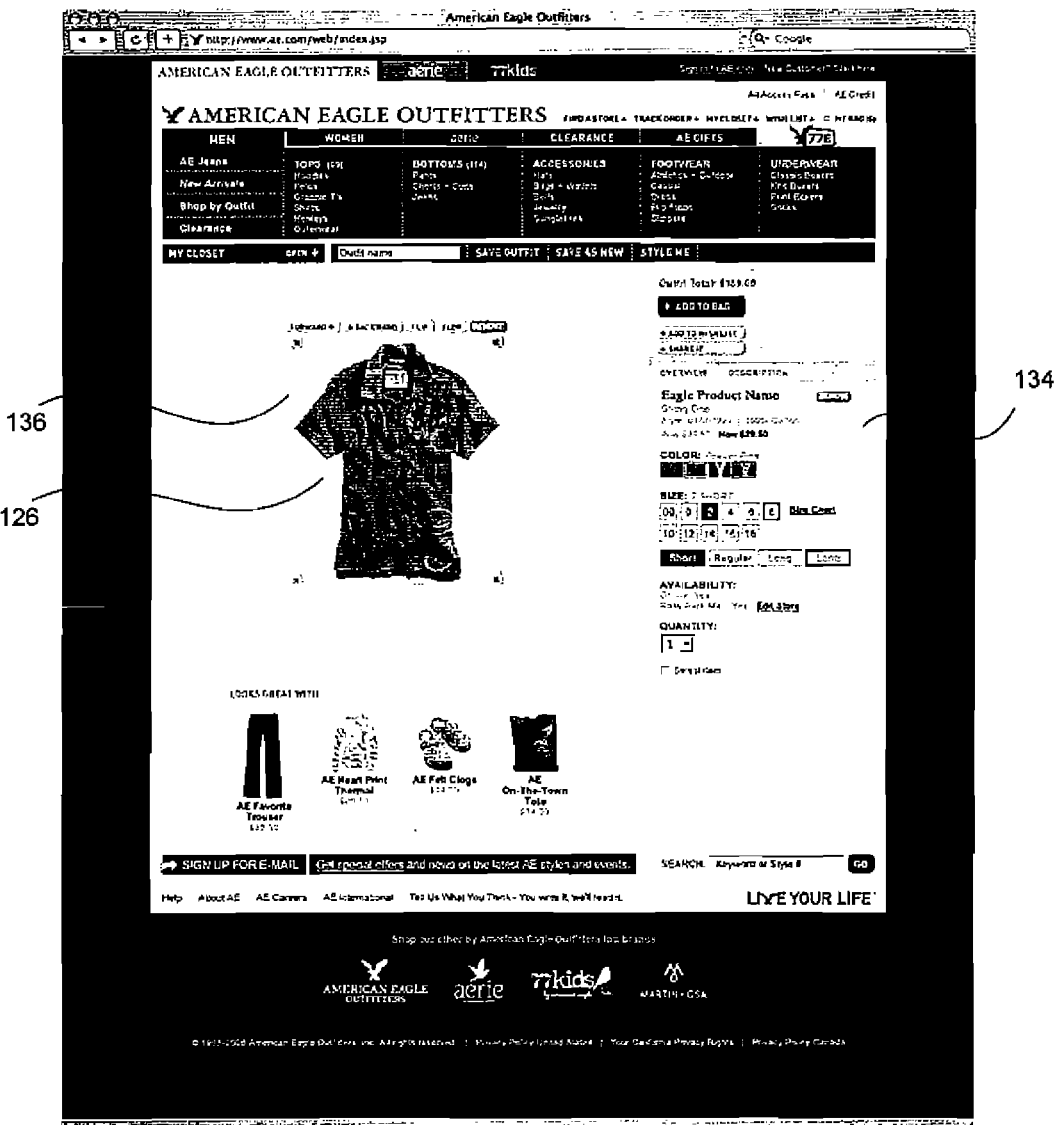
Figure 2J:
Figure 2K:
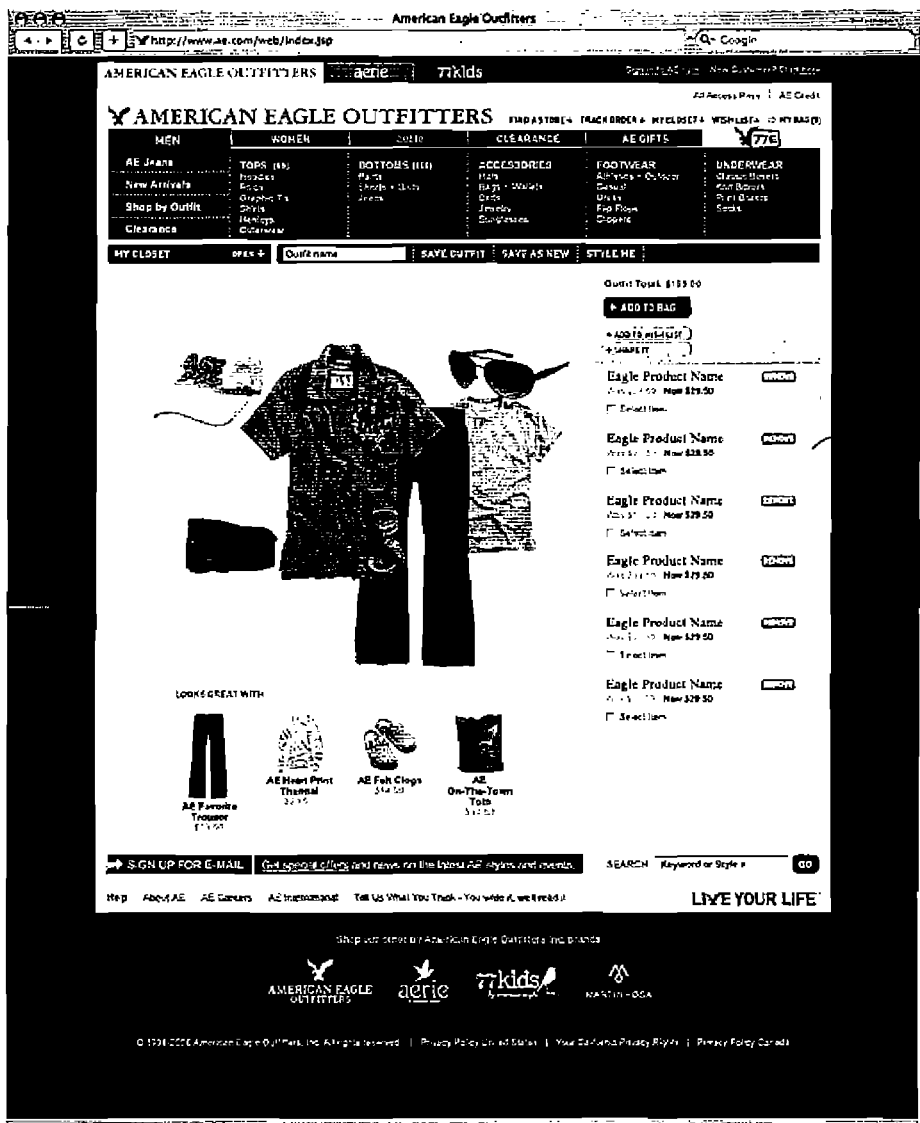

FIG. 2I shows selected and dragged-and-droppable area 136 with item 126. Options panel 134 is also shown. Options panel 134 provides setting attributes of item 126, such as color, size, etc., as described above in conjunction with FIGS. 1A-1F. FIG. 2J shows an expanded options panel 134 which lists the other items in the outfit that includes item 126 and allows the user to remove the other items. FIG. 2K shows options panel 134 which lists only the items within the outfit and allows the user to delete a particular item.

Other configurations and user interfaces may also be used to manipulate and/or purchase items and outfits without departing from the scope of the invention.

Figure 3:
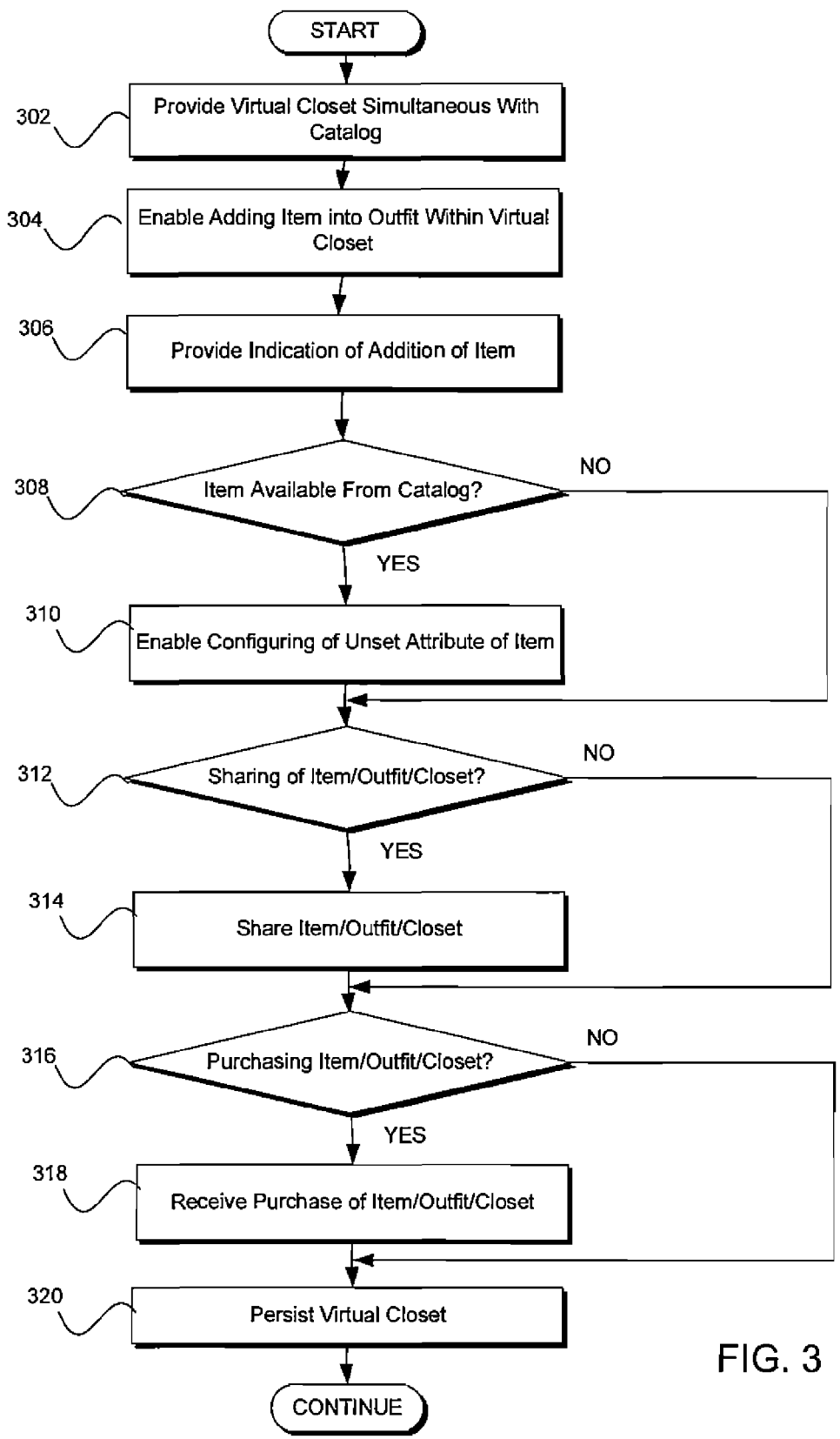
FIG. 3 shows an example of a process for managing an outfit in accordance with one or more embodiments of the invention.

FIG. 3 shows an example of a process for managing an outfit. The process of FIG. 3 may be performed by components of FIG. 4 and/or may use the interfaces of FIGS. 1A-1F. The process begins at step 302, where a virtual closet is provided simultaneously with a provided catalog or a electronic media source, such as a website which provides the catalog. In one embodiment, the virtual closet and/or catalog may be provided to a member of a social network. The closet belonging to or associated with the member may be provided.

In one embodiment, the catalog is a clothing item catalog of purchasable clothing items configured to provide a drill-down of a plurality of clothing items through a visual indication of the clothing item within at least one of the virtual closet. In one embodiment, the virtual closet may be enabled by a widget. In one embodiment, the widget interface may be embedded within a webpage of a first web domain, and/or commands for managing the virtual closet are relayed between the first web domain and a second web domain, wherein relaying comprises enabling cross-domain communication within a browser.

In one embodiment, the closet is a personal digital closet that persists when a user exits a website comprising an online catalog to another part of the website. In one embodiment, the closet follows the user through the website. That is, the closet is displayed on a portion of the website as the user navigates from page to page. In one embodiment, the closet displays user picked but unpurchased items when a user returns to an online retail catalog after previously exiting the website. In one embodiment, the items within the virtual closet comprise at least one purchased item and at least one unpurchased and/or unpurchasable item from the catalog. In one embodiment, the digital closet is configured to automatically load purchased items into the closet, to load items chosen by a user associated with the closet, or the like. In one embodiment, an item is configured to be added to the closet without selecting the item, e.g., by navigating to an item, a type of item, or the like, by copying an outfit of another user, or the like.

In one embodiment, a navigation of the electronic media source, website, or catalog, is provided while simultaneously providing, over the network, the virtual closet for display on at least one device. In one embodiment, a user associated with the outfit may load the virtual closet though a website. For example, as the user navigates the website to read more about an item, or communicate with others, an icon representing the virtual closet may be within the display of the webpage.

The catalog may be provided within the website (e.g., within a same webpage as the outfit). In one embodiment, a Hyper Text Transfer Protocol (HTTP) cookie or other statement management mechanism (e.g., Internet Engineering Task Force (IETF) Request for Comments (RFCs) 3109 and 3965) is used to recognize the user and associate and/or provide the closet associated with the user.

At step 304, adding an item to an outfit within the virtual closet is enabled. In one embodiment, the item may be added using a drag-and-drop of the item into a visual area, such as a canvas. In another embodiment, the item may be added with key entries to automatically send an item to the closet, or the like. The mechanism for adding the item may be set by the user. In yet another embodiment, an activation component is provided within the virtual closet widget to launch an interface for providing a selectable catalog of items that are configured to be added into the outfit data. In one embodiment, the activation component may be a link to a category and the category may be expanded to provide sub-categories or clothing items using, for example, a double click. In one embodiment, an item to be configured into the outfit is received, for example, from a navigation in an interface, through an API, or the like. In another embodiment, the item is received as an image captured on a mobile device. In one embodiment, a drag-and-drop of the item is received from a plurality of portions of the electronic media source (e.g., from a first part of a website and a second part of a website).

In one embodiment, an item may be suggested to the user. In one embodiment, the outfit may be personalized based on style information about a user's clothing preferences. The suggested item may be selected and received for addition to the closet.

In one embodiment, network data comprising a Uniform Resource Identifier (URI), including a Uniform Resource Locator (URL) representative of the item and a configuration of the item within the at least one outfit is received. The URI may be received from an electronic media source other than the electronic media source displaying the at least one virtual closet widget. The URI may be provided in the electronic media source as a link attached to a multimedia item representative of the outfit (e.g., an image or video of the item linked to). If desired, the item is added to the closet to a list of available items that may be subsequently arranged within an outfit.

In one embodiment, the user's behavior in navigating a catalog and/or a selection of items may be recorded in logs or histories for personalization and analysis as described herein.

At step 306, an indication of the addition of the item is provided. In one embodiment, in response to adding the item, a visual indication of the item is provided on the virtual closet widget, wherein the item comprises at least one unset attribute for setting through the virtual closet. The indication may be an icon, a logo, a graphic, or text indicating the item. The item may be arranged within an outfit by, for example default parameters. For example, the item may be placed randomly, or though the use of rules (e.g., place shirts on top of pants, and shoes below pants), or statistically determined based on prior arrangements by the user and/or for the added item.

At decision step 308 it is determined if the item is available from the catalog. The item may be registered in the catalog as an entry in a data structure such as a database. The database may be changed to represent that an inventory of a particular item is in or out-of-stock based on a purchase of the type of items, a supply of more of the same type of items, or the like. If it is determined that the item is available from the catalog, processing continues to step 310. Otherwise, processing continues to decision step 312.

At step 310, configuring an unset attribute of the item is enabled. In one embodiment, a configuration component is provided within the virtual closet for configuring the unset attribute of the item.

At decision step 312, it is determined if an item, an outfit, the closet, or a combination thereof is to be shared. In one embodiment, a user may select to share any one or a combination thereof of the item, outfit, or closet. The user may indicate the selection using a navigation within the widget interface, such as by clicking a share button. If it is determined that an item, an outfit, the closet, or a combination thereof is to be shared, processing continues to step 314. Otherwise, processing continues to step 316.

At step 314, the item, the outfit, the closet, or a combination thereof is shared. The outfit configured with the item may be shared or otherwise provided in response to a request for the outfit. In one embodiment, the item is received from a first member of a social network and the outfit is provided to second member of the social network, wherein the member and the other member are separated by at least two degrees of separation within the social network At decision step 316, it is determined if an item, an outfit, the closet, or a combination thereof is to be purchased, e.g., by clicking on a purchase button. If an item, an outfit, the closet, or a combination thereof is to be purchased, processing continues to step 318. Otherwise, processing continues to step 320.

At step 318, a purchase of the item, the outfit, the closet, or a combination thereof is received and the purchase is processed. In one embodiment, closet items are configured to be transferred to a digital cart for purchase. Purchasing may comprise receiving configuration of the items in the cart for at least one unset attribute of an item in the cart. Purchasing may also comprise receiving shipping and/or billing information, modifying the catalog to indicate that the item purchased is no longer available, or the like. In one embodiment, the digital closet is configured to automatically load purchased items into the closet of the purchaser after and/or during purchase.

At step 320, the virtual closet, including the outfits and items within the virtual closet are persisted. In one embodiment, the closet, item(s), or outfit(s) are persisted when they are changed or configured. For example, the outfit/closet is persisted when the item is added at step 304. Processing then continues to other processing.

Figure 4:
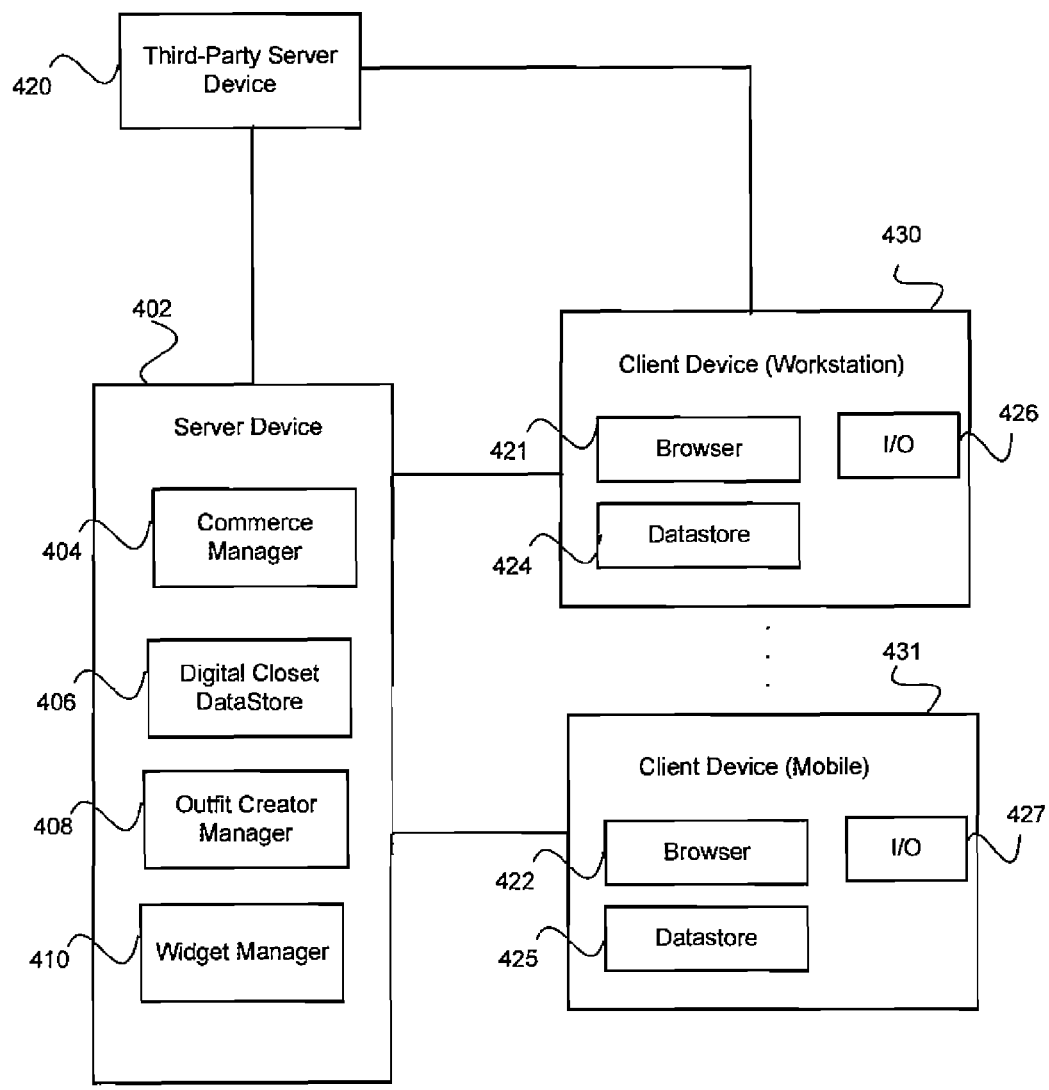
FIG. 4 shows an example of a system for managing an outfit in accordance with one or more embodiments of the invention.

FIG. 4 shows an example of a system for managing an outfit. Components of FIG. 4 may be hardware or software components, including computing devices, integrated circuits, or the like. Components of FIG. 4 may be separate devices communicating with each other over a network (including a wireless network). At least some of the components may be within the same device and may communicate with each other over a bus, direct connection, or the like.

As shown, client devices 430-431 are in communication with server device 402. Third-party server device 420 is in communication with server device 402 and/or client device 430.

Server device 402 includes commerce manager 404, digital closet datastore 406, outfit creator manager 408, and widget manager 410. Commerce manager 404 includes any component for browsing, managing, or purchasing items, including retail items such as clothes or accessories.

Digital closet datastore 406 includes any component for storing data about a virtual closet. The virtual closet stored in digital closet datastore 406 may comprise a plurality of outfits and may be associated with a user. An outfit may include number and types of items in the outfit, a configuration and positioning of the items, or the like.

Outfit creator manager 408 includes any component for managing an outfit. Outfit creator manager 408 may be in communication with other the components of server device 402 to enable managing the outfit. In one embodiment, outfit creator manager 408 may perform the process of FIG. 3.

Widget manager 410 includes components for providing an interaction with an outfit, including an outfit within a virtual closet. In one embodiment, widget manager 410 may provide a web-based component for managing the outfits. The widgets may be provided within a webpage provided by server device 402 and/or other devices, including third-party server device 420.

Third-party server device 420 includes any component for providing information over a network, including a server device, a mobile device, or the like. Third-party server device 420 may include a web server, a social networking server, or the like. Third-party server device 420 may provide social networking, content, or communication services, including blogs, news, emails, or the like. In one embodiment, third-party server device 420 may provide an outfit creator/virtual closet component adjacent to, in close proximity to, and/or collocated with the provided services.

Client devices 430-431 may be any computing device, including workstations, servers, mobile devices, or the like. Client devices 430 includes browsers 421-422, datastores 424-425 and input/output (I/O) components 426-427. Browsers 421-422 include any component for providing media and interaction over a network. In one embodiment, browsers 421-422 may provide the interfaces of FIGS. 1A-1F and/or the processes of FIGS. 1A-1F and FIG. 3. In one embodiment, browsers 421-422 include a web browser, a mobile device browser, a text browser, or the like. Browser 421-422 communicates with server device and/or third-party server device 420 to receive and provide browsing of at least one HTML, XML, or other markup language page. In one embodiment, browser 421 provides a cross-domain enabled webpage. Cross-domain widgets or other components of the webpage may load at least some components embedded within the webpage from third-party server device 420 and server device 402. In one embodiment, a social networking component and information may be loaded from third-party server device 420 and a virtual closet and outfit creator component may be loaded from server device 402. The social networking component may provide sharing of an outfit, item, or closet between members of the social network managed by the social networking component. The cross-domain components may be enabled by, for example, cross-domain proxies, cross-domain JavaScript Object Notation (JSON). Datastore 424-425 may store outfit information. The outfit information may be uploaded through browsers 421 or 422 and provided to server device for associating with or included with outfit data. In one embodiment, the outfit data may be stored within digital closet datastore 406. I/O components 426-427 include any component for controlling browser 421-422 and/or providing information, such as a mouse, keyboard, touch screen, or the like. In one embodiment, I/O components 426-427 may enable dragging-and-dropping of an item into an outfit.

Components of the devices of FIG. 4 may comprise or be in communication with a processor readable medium for performing the operations of the invention. For example, commerce manager 404 and/or widget manager 410 may comprise or be in communication with a disk drive, RAM, ROM, or other processor readable medium for managing an outfit. The medium may comprise instructions. The instructions, when executed by a processor, may cause the processor to perform actions of FIGS. 1A-1F and FIG. 3.

Figure 5:
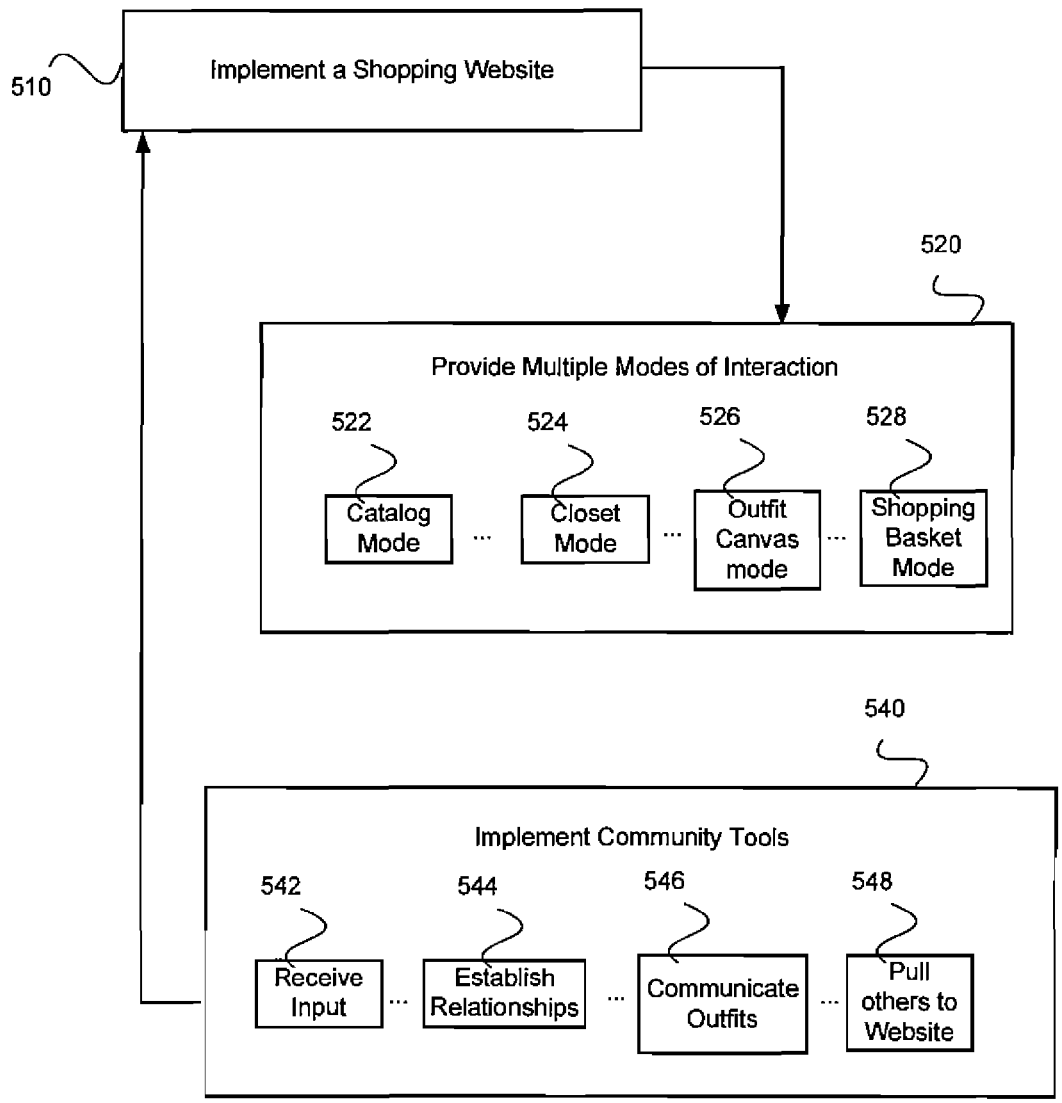
FIG. 5 shows a flow chart which is illustrative of implementing featured for providing improved shopping experience and sales in accordance with one or more embodiments of the invention.

Further and clarifying features and aspects can also be understood from the chart illustrated in FIG. 5. Methods and systems for providing a shopping experience to general users via a website (e.g., a website of a single retailer, a website of a departments store, products aggregator website, etc.) that may be implemented in step 510. Preferably, the website is implemented on the Internet. The website my provide shoppers with multiple modes of interaction 520 with the website. Each mode can for example be distinguishable from the other by the purpose of the mode, the product items that are available for interaction, and the set of interactions that are available to individual users. A community tool may also be implemented 540. The community tool may provide a number of features that aid to drive new users to the website or drive users to return to the website and to extend the amount of time that a user interacts with the website. Methods and features illustrated in FIG. 5 are particularly suited for the shopping of garment and accessories but if desired such features and methods can be applied to other fields.

Step 520 can include implementing a plurality of different modes. For example, at step 522, a catalog mode can be provided. A catalog mode provides a user with the ability to view and navigate a website's current catalog of products (e.g., all of which may be available for purchase during the visit). At step 524, a closet mode may be implemented. The closet mode provides shoppers with the ability to add items from the catalog to a personal closet to store the item indicating a state of added interest while the shopper is in the website and wherein the shopper can add items from the closet to a shopping basket to finalize a purchase or select to remove items from the closet. The closet mode can be configured to provide a shopper with a tool that persists so that as a user moves to other parts of the catalog items of interest (previously added to the closet) are carried along. By this tool, a user can evaluate closet items with respect to other items in the catalog. Items can be added to the catalog quickly and easily such as by a drag and drop operation or double click operation to aid in the speed of use (e.g., without requiring the user to take an action to confirm or set product parameters). In some embodiments, if desired, some product parameters may be automatically set based on personal information on the website. The content of the closet may persist if for example a user leaves a website and comes back the next day to resume shopping (e.g., using cookies or login settings). The closet can exist independent of the catalog but may contain a subset of items in the catalog and/or may contain items not currently in the catalog. The closet can exist independent of a shopping basket or checkout mode where a user has identified and set items that are ready for checkout and purchase. A closet can provide individual users with a place where a user can hold a plurality of outfits for further consideration before adding an outfit or items in an outfit to a shopping basket for checkout. A closet can store outfits created by a user that is personal to the user as one compartment in the closet. Another compartment may be individual items added by that user. Closet content can be named a by user. Closet content can be stored on a server of the website. In a closet mode, a user's interaction can be limited to a set of interactions such as adding or removing items or outfits to or from the closet, expanding or viewing the content (e.g., in thumbnail mode), adding an item or outfit to a shopping basket, viewing more detailed product information, and moving an item or outfit to an outfit canvas. If desired, other interactions or fewer interaction may be implemented such as integrating community tools with that mode.

In a catalog mode, a user's interaction can be limited to a set of interactions such as view catalog items and navigating a catalog, adding items to the closet, a shopping basket, or an outfit creator, and viewing more detailed product information. If desired, other interactions or fewer interaction may be implemented such as integrating community tools with that mode.

At step 526, an outfit canvas mode can be provided. An outfit canvas mode can be provided wherein individual shoppers can try out visual combinations and arrangements of items to coordinate and evaluate and wherein two or more items can be resized or moved on the canvas to allow the shopper to assemble various arrangements or combinations to aid in the evaluation of the items and further wherein a shopper can name and save an outfit comprising multiple items to be held in the closet. Options in the canvas may include options such as rotate, move forward or back, or flip. The canvas mode provides a user to shop by for example matching colors, styles, accessories, garment types, etc. The canvas can provide a visual tool that aids the user to better evaluate their interest in a particular item or outfit. Interaction within the canvas is limited to the items currently in the canvas but can also include the ability to add items from the closet or catalog using a simultaneously displayed interface to those modes. A user may also be able to remove items to such resources. In a canvas mode, a user's interaction can be limited to a set of interactions such as the ability to move, arrange, or resize items in the canvas, to add items (or outfits, e.g., by naming an outfit) to the closet, to add to a shopping basket, and viewing more detailed product information. If desired, other interactions or fewer interaction may be implemented such as integrating community tools with that mode.

A shopping basket mode can be provided at step 528. The shopping basket is typically understood to be the last step before checkout where a user has decided to purchase an item and generally just needs to pay for the items in the basket. In a shopping basket mode, a user's interaction can be limited to a set of interactions such as adding or removing items, finalizing a purchase, and viewing more detailed product information. If desired, other interactions or fewer interaction may be implemented such as integrating community tools with that mode.

Other modes may also be implemented. Modes can exist simultaneously such as by displaying regions for user interaction to gain the benefit of the modes at the same time to user (e.g., in the same browser window).

At step 540, features can be implemented to form a community that supports the websites. The features can include one or more components.

For example, at step 546, a community tool can be provided that presents one or more options to a current shopper. The tool can include a feature where the current shopper can select to transmit a message (e.g., by way of the website) such an instant message, SMS, MMS, e-mail or post it wherein the message can for example comprise a link corresponding to a particular outfit selected by the current shopper to a desired recipient. The link may be used to pull other individuals (e.g., those who are not shopping at the website) into website at step 548. The link may for example, be a URL link (e.g., a series of text, a button, or visual image of the outfit) that when selected pulls a social contact of a shopper (e.g., the recipient of the message) into the website to view that particular outfit in the outfit canvas mode. The link can pull the recipient to an interactive outfit canvas in the website displaying the outfit and from which the recipient also has access to the personal closet and an online catalog to revise the outfit within the canvas. This way, the recipient is put in the position, for example, to able to now readily "play" with the outfit and add or remove items, which may be an instinctive act when the user is presented with the outfit and at the same tools to modify the outfit to their desire. If desired a read-only view can be presented.

At step 544, the website may receive and store information on the relationship between users, which may also be used for controlling one or more levels of access. For example, the site may store whether different users are friends and provide tiers of connection and by way of such relationship information, establish circles of contacts for a user. This data can be used to implement the sharing of ones closet with friends. It can also be used to provide peripheral information based on the type of relationship. For example, parents or relatives may receive visual displays about their children or relatives about items or outfits that the child or relative themselves or their friends like or dislike without sharing the child's closet with the relative (e.g., but sharing the closet with the child's friends). At step 542, the relationship or other information can be used to receive evaluation input (e.g., number of stars or textual input) about an outfit that a user has put in his closet. This provides an incentive to return to the website over time to see how others such as his friends have rated or given input on the clothing.

Other community tools can also be implemented as illustratively described herein such as widget. A shopper may add a widget associated with the shopping site in a third party site such as a blog or social networking site. The widget can be modular set of code that executes to pull one or more outfits from the shopping website to be able to display that outfit in the third party site. The widget may also be generic in a sense that it will figure out personal association based on the where it resided and correspondence to a user on the shopping website, which automates the feed and may be dynamic.

Using the relationship information, the website can provide access to information that is otherwise blocked based on relationship information of a current shopper to other shoppers on the website. Individual may also add items from a friend's closet to their own closet.

A user may be provided with an opportunity to delete an item from an outfit such as by display an option to delete an item near an item when displayed in an outfit or within the closet but pressing delete. If desired, doing so, may prompt the user as to whether all usage of that item in stored outfits should be deleted or whether just one instance in a particular outfit should be deleted. The selection will result in deleting the item from an outfit or all outfits in personal closet. If desired a friends closet can be expandable next to a current user's closet so that a current shopper can view their own personal closet and view their friend's personal closet at the same time.

If desired, the removal or deletion of an outfit, may require a user to login or be authenticated to allow the removal or deletion to be completed.

As generally described above, an outfit can be pulled from closet to a canvas.

Specialized resources such as stylist picks and most popular may also be digital container that are available to a shopper when for example in the canvas or closet to added from to the closet or canvas from those resources.

Features described herein may be provided to a member of a website such as an individual how has a login ID and password and is currently logged into the site, to a member who is using the site but is not currently logged in (e.g., using a cookie to identify the user to be a member), or anonymous user who are not registered with the website. The features provided to users may vary depending in the user being a member, a not-logged-in member or an anonymous users. For example, an anonymous member may not be able to leave the site and return to be able to view a closet from a previous visit. If desired, the system may be configured to synchronize a closet between when a user uses a site after logging or when the user uses the site as a not-logged-in member.

As used herein, the term "outfit" refers to at least two items that are associated with each other by a shopper or a website (e.g., in a canvas, closet, featured space, etc.) that is typically represented by an electronic media, such as a database, object, or the like unless the context indicates otherwise or further clarifies.

As used herein, the term "closet," "virtual closet," or "digital closet" are generally used interchangeably unless the context indicates otherwise or further clarifies. The term "cart" or "shopping basket" refers to a collection of outfit items that is ready for purchase unless the context indicates otherwise or further clarifies. A "catalog" of items refers to a collection of items that is offered for purchase by a vendor.

As used herein, the term "widget" refers to an embedded user interface that may be placed within another user interface unless the context indicates otherwise or further clarifies.

Methods illustratively described herein can be implemented on one or computers and software implemented the computers such as using equipment illustratively shown in FIG. 4. Such methods may also be stored on electronic machine readable media to be used on computers for implementing such features.

Features of a digital closet as illustratively described herein may be particularly advantageous for example, because, within a retail clothing site, a user can have access to and view a closet while in (or moving between) different segments or departments (e.g., shoes, shirts, etc.) and can move back and forth between the segments and the closet to be able to be provide a more effective and efficiently shopping experience.

Figure 6:
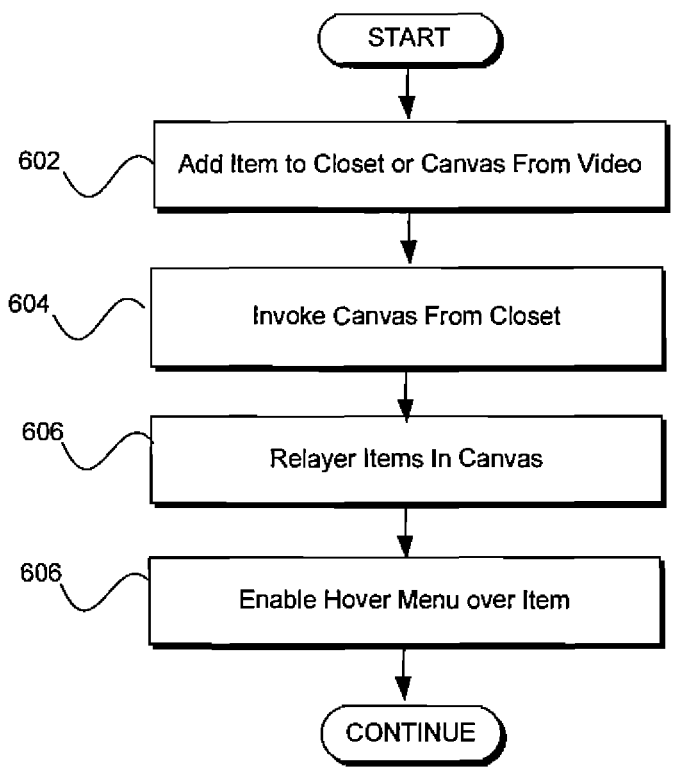
FIG. 6 show flow charts which are illustrative of implementing features for providing improved shopping experience and sales.

FIG. 6 shows a flow chart which is illustrative of implementing features for providing improved shopping experience and sales. The process of FIG. 6 may included as a mode of interaction 520 in FIG. 5 and/or may enhance one of the modes shown in 520. The process of FIG. 6 may also enable adding an item as describe in step 304 of FIG. 3. The process of FIG. 6 may be implemented or embodied in devices of FIG. 4 and/or may use the interfaces of FIGS. 1A-1F and/or 2A-2K. The steps of FIG. 6 may be performed in other ordering then the one shown without departing from the scope of the invention. Also, some steps may be optional and may not be performed. For example, step 602 may be optional, and in some embodiments, may not be performed.

Figure 8:
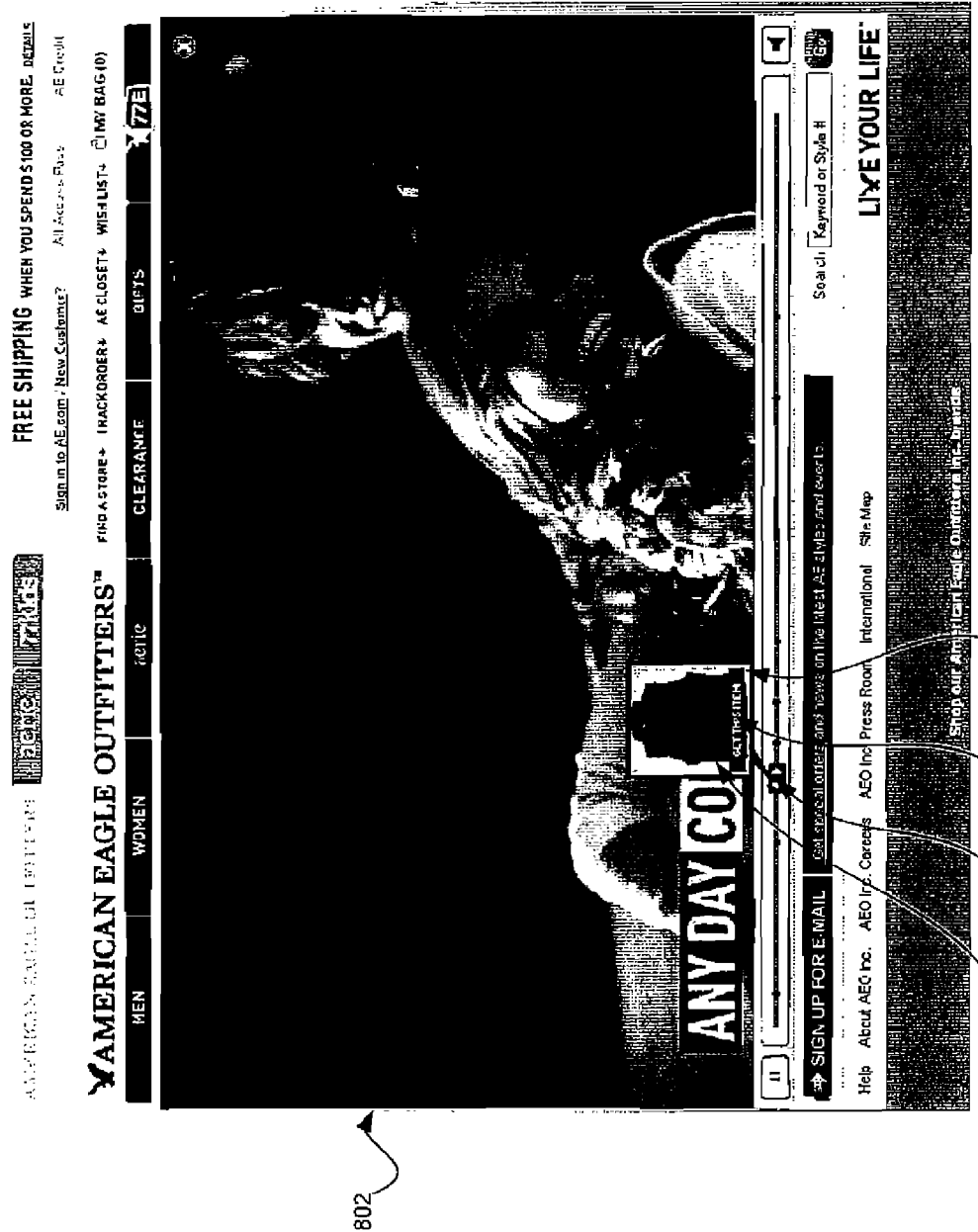
FIG. 8 shows a user interface for shopping from a video, in accordance with one or more embodiments of the invention.

Processing begins at step 602, where a user may add an item to the closet or even an outfit (e.g., via the canvas) by adding the item from a shop-the-video interface, such as shown in FIG. 8. As shown in FIG. 8, a video 802 may be invoked, for example, by a user, automatically, periodically, by a shared video sent to an email, a social networking website, via a widget etc. As the video plays, an item 804 associated with a timeframe within the video may appear in a hover box 806 over a visual representation 806 of the current timeframe 808. The timeframe may be a range of time (e.g., in seconds or minutes). The hover box 806 may have specific user interface 810 (e.g., "get this item" button) to add the item to a closet, outfit (canvas), wish list, share the item, etc. In one embodiment, selecting the user interface 810, the item can be added to a closet or canvas, e.g., as part of an outfit.

Figure 7A:
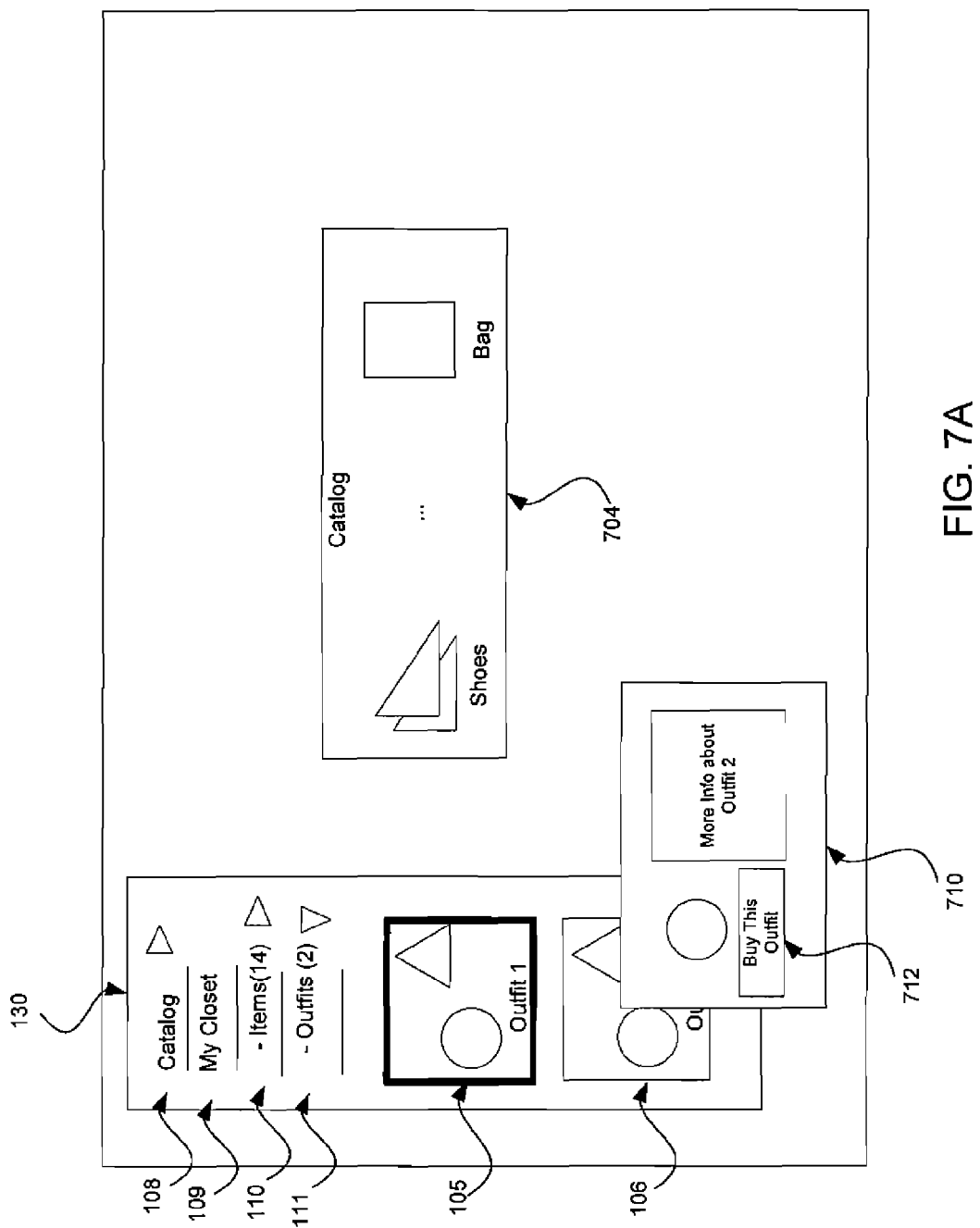
FIGS. 7A-7B shows a user interface for invoking a canvas.

At step 604, a user can invoke the canvas from within the closet such as from an individual item in the closet. As shown in FIG. 7A, the closet 130 is displayed while the user surfs the site (e.g., the catalog 704). At FIG. 7B, item 108-110 or outfit 105-106 can be activated to invoke the canvas 708, thus replacing (or even overlaying) the catalog 704 with the canvas 708. Canvas 708 can be used to create and manage an outfit as described herein. The ability to invoke the canvas is something that can be available from inside the closet (e.g., regardless of where a user's main panes are currently located) and can be triggered from an item or outfit, and this feature may not necessarily be tied other features described herein.

At step 606, a user can move an item incrementally forward and back in layers in comparison to other items on the canvas. As shown in FIG. 7A, item 126 can be moved forward in the layers above item 125, or vice versa. Any of number of items can be moved in any level of the layer of items. The user can use a drop down menu, key menu, or other input to change the layering of the items. The layering of the items is stored and associated with the outfit for later retrieval. The ability to relayer items is something that can be available from inside the closet (e.g., regardless of where a user's main panes are currently located) and can be triggered from an item or outfit, and this feature may not necessarily be tied other features described herein.

At step 608, a user can inspect an item on the catalog, canvas, or closet (or any other part of the shopping site) by invoking a hover menu to appear above an icon of the item. In one embodiment, an item (e.g., visually represented as a thumbnail) in the closet can be expanded and hover box provided, if a user hovers the mouse or other input (gesture, touch, pointing, etc.) on item. For example, hover box 710 can be displayed above outfit icon 106 of FIG. 7A when a user hovers his mouse over outfit icon 106. The interface provides options specifically for that item and the catalog, canvas, or closet. A button to add the item to the closet may appear with the hover information, if the item is in the catalog or invoked from a shop-the-video interface. A button to add the item to an outfit (and canvas) may appear with the hover information, if the item is in the closet. A button to add the item to re-layer the item may appear with the hover information, if the item is in the canvas. For example, button 712 may enable a user to buy an outfit. The ability to display a hover box is something that can be available from inside the closet (e.g., regardless of where a user's main panes are currently located) and can be triggered from an item or outfit, and this feature may not necessarily be tied other features described herein. Processing then returns to other processing.

Figure 7B:
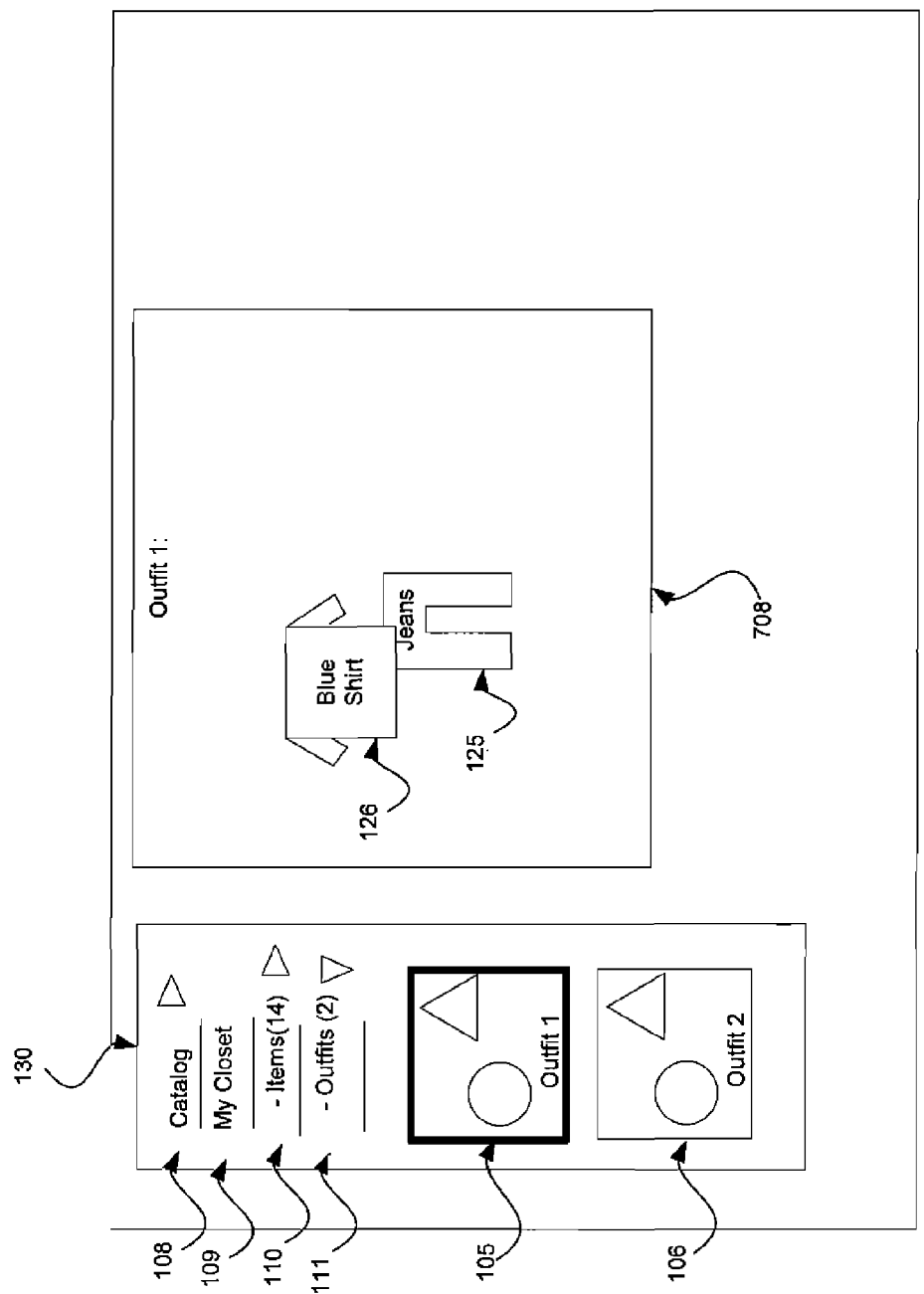

In some embodiments, the process of FIG. 6 and the interfaces of FIGS. 7A-7B, and 8 may be embodied in a computer implemented method, system, apparatus or media as disclosed herein.

The foregoing is merely illustrative of the principles of this invention and various modifications can be made by those skilled in the art without departing from the scope and spirit of the invention.

What is claimed is:

1. A method for managing an outfit over a network comprising:
   providing, over the network, a navigation of an electronic media source while simultaneously providing, over the network, a virtual closet widget representative of outfit data for display on at least one device;
   providing an activation component within the virtual closet widget to configure a panel for providing a selectable catalog of items that are configured to be added into the outfit data;
   in response to adding an item, providing a visual indication of the item on the virtual closet widget, wherein the item comprises at least one unset attribute for setting through the virtual closet; and
   wherein adding the item comprises receiving network data comprising a Uniform Resource Identifier (URI) representative of the item and a configuration of the item within the outfit, wherein the URI is received from an electronic media source other than an electronic media source displaying the virtual closet widget, and wherein the URI is provided in the electronic media source as a link attached to a multimedia item representative of the item or outfit.

2. The method of claim 1, further comprising:
   providing a configuration component within the virtual closet for configuring the unset attribute of the item, if the item is marked as available within the catalog.

3. The method of claim 1, wherein the items within the virtual closet comprise at least one purchased item, at least one unpurchased item from the catalog, or at least one unpurchasable item.

4. The method of claim 1, further comprising:
   receiving a drag-and-drop of the item from a plurality of portions of the electronic media source.

5. The method of claim 1, further comprising:
   embedding the virtual closet within a webpage of a first web domain; and
   relaying commands for managing the virtual closet between the first web domain and a second web domain.

6. A system for managing an outfit over a network comprising:
   one or more computers configured to provide:
      a closet datastore comprising outfit data representative of at least one outfit; and
      a virtual closet manager configured to perform actions comprising:
         providing at least one virtual closet widget representative of the outfit data for display on at least one network device;
         adding an item configurable within the outfit data to cause a visual indication of the adding to appear on the virtual closet widget;
      wherein adding the item further comprises:
         receiving network data comprising a Uniform Resource Identifier (URI) representative of the item and a configuration of the item within the at least one outfit, wherein the URI is received from an electronic media source other than the electronic media source displaying the at least one virtual closet widget, and wherein the URI is provided in the electronic media source as a link attached to a multimedia item representative of the item or outfit.

7. The system of claim 6, wherein the actions further comprise:
   providing, over the network, a navigation of an electronic media source while simultaneously providing at least one virtual closet widget, wherein the item is added from the electronic media source.

8. The system of claim 7, wherein the electronic media source comprises a webpage, and wherein the webpage comprises:
   a catalog mode wherein a region is displayed where one or more shoppers can browse catalog items and select to take different actions with respect to the catalog items including adding at least one catalog item to a closet, an outfit canvas, or a shopping basket to finalize, a purchase;
   a closet mode wherein shoppers can add items from the catalog indicating a state of added interest while staying in a website and wherein each shopper can add at least one item from the closet to the shopping basket to finalize a purchase or remove at least one item from the closet;
   an outfit canvas mode wherein individual shoppers can try out visual combinations and arrangements of items to coordinate and evaluate and wherein two or more items can he resized or moved on the canvas to allow each shopper to assemble various arrangements or combinations to aid in the evaluation of the items and further wherein each shopper can name and save an outfit comprising multiple items to be held in the closet; and
   a shopping basket mode wherein a shopper can add items to a basket that the shopper has decided to purchase at checkout.

9. The system of claim 6, wherein the actions further comprise:
   personalizing an outfit based on style information about a user's clothing preferences.

10. The system of claim 6, further comprising:
    a clothing item catalog of purchasable clothing items configured to provide a drill-down of a plurality of clothing items through a visual indication of the clothing item within the at least one virtual closet widget.

11. A processor readable medium for managing an outfit, the processor readable medium comprising instructions that when executed by a processor cause the processor to perform actions comprising:
provi ding an interface for managing a user's virtual closet comprising the outfit;
receiving an item to be configured into the outfit; and
providing the outfit configured with the item in response to a request for the outfit;
wherein receiving the item includes receiving network data comprising a Uniform Resource Identifier (URI) representative of the item and a configuration of the item within the outfit, wherein the URI is received from an electronic media source other than an electronic media source displaying at least one virtual closet widget, and wherein the URI is provided in the electronic media source as a link attached to a multimedia item representative of the item or outfit.

12. The processor readable medium of claim 11, wherein the item is received as an image captured on a mobile device.

13. The processor readable medium of claim 11, wherein the item is received from a first member of a social network and the outfit is provided to a second member of the social network, and wherein the actions further comprise:
limiting an access of the outfit to a friend of an owner of the outfit within the social network.

14. The processor readable medium of claim 11, wherein the actions further comprise:
embedding a widget version of the interface within a webpage of a first web domain; and
relaying commands for managing the virtual closet between the first web domain and a second web domain, wherein relaying comprises enabling cross-domain communication within a browser.

15. The processor readable medium of claim 11, wherein the actions further comprise:
sharing the outfit by sending a message using a mobile device and posting to an external third-party webpage.

16. The processor readable medium of claim 11, wherein the actions further comprise:
inspecting the item using a touch input.

17. The processor readable medium of claim 11, wherein the actions further comprise providing a slideshow view for browsing a current selection item within a category of clothing while simultaneously displaying items before the current selection item and items after the current selection item within an ordering of items within the catalog, wherein the current selection item appears at the same scale as other items within the outfit.

18. A processor readable medium for managing an outfit over a network comprising instructions that when executed by a processor cause the processor to perform actions comprising:
providing a virtual closet widget;
providing an activation component within the virtual closet widget to provide a selectable catalog of items that are configured to be added into the virtual closet widget; and
providing a slideshow view for browsing a current selection item within a category of clothing while simultaneously displaying items before the current selection item and items after the current selection item within an ordering of items within the catalog, wherein the current selection item appears at the same scale as other items within the outfit.

19. The processor readable medium of claim 18, wherein the actions further comprise:
receiving a request to copy at least one item from a member's virtual closet into a virtual closet of another member.

* * * * *